United States Patent
Danneman et al.

(10) Patent No.: US 9,962,633 B2
(45) Date of Patent: May 8, 2018

(54) DISK TYPE FILTERING APPARATUS

(71) Applicant: ALFA LAVAL CORPORATE AB, Lund (SE)

(72) Inventors: Charles G. Danneman, Willis, TX (US); Ross Lee Drescher, Houston, TX (US); Matthew Cody Adams, Houston, TX (US)

(73) Assignee: ALFA LAVAL CORPORATE AB, Lund (SE)

( * ) Notice: Subject to any disclaimer, the term of this patent is extended or adjusted under 35 U.S.C. 154(b) by 0 days. days.

(21) Appl. No.: 14/476,354

(22) Filed: Sep. 3, 2014

(65) Prior Publication Data

US 2016/0059157 A1    Mar. 3, 2016

(51) Int. Cl.
  *B01D 29/68*    (2006.01)
  *B01D 29/11*    (2006.01)
  (Continued)

(52) U.S. Cl.
  CPC .......... *B01D 29/684* (2013.01); *B01D 29/114* (2013.01); *B01D 29/15* (2013.01); *B01D 29/33* (2013.01); *B01D 29/39* (2013.01); *B01D 29/52* (2013.01); *B01D 29/68* (2013.01); *B01D 29/688* (2013.01); *B01D 2201/082* (2013.01); *C02F 1/004* (2013.01)

(58) Field of Classification Search
  None
  See application file for complete search history.

(56) References Cited

U.S. PATENT DOCUMENTS 2,785,432 A * 3/1957 Rockwell .................. A47L 9/02
                                                  15/375
3,949,442 A * 4/1976 Chandler .............. A47L 7/0009
                                                  15/1.7
(Continued)

FOREIGN PATENT DOCUMENTS

DE   3902829 A1    8/1990
EP   0498037 A1 *  8/1992  .......... B01D 29/395
(Continued)

OTHER PUBLICATIONS

International Search Report and Written Opinion dated Dec. 7, 2015 for Application No. PCT/EP2015/069825.
(Continued)

*Primary Examiner* — Michael H Wilson
*Assistant Examiner* — Katherine Will
(74) *Attorney, Agent, or Firm* — Patterson + Sheridan, LLP

(57) ABSTRACT

A fluid filtering apparatus such as for filtering particulates and other materials from treated water includes a tank and a filtering region configured as a plurality of individual effluent regions, defined in part by channel frames, disposed between a plurality of influent regions interposed between the effluent regions. A double sided backwash shoe is scannable in the influent regions, to simultaneously clean opposed filter media exposed thereto. The backwash shoe is free to move inwardly and outwardly of the opposed filter media. Additionally, the backwash shoe includes an end opening, positioned adjacent to the base of the tank, to remove sludge and particulates which have settled to the area near the base of the tank while backwashing a filter media.

20 Claims, 18 Drawing Sheets

(51) Int. Cl.
    *B01D 29/15*    (2006.01)
    *B01D 29/33*    (2006.01)
    *B01D 29/39*    (2006.01)
    *B01D 29/52*    (2006.01)
    *C02F 1/00*    (2006.01)

(56) References Cited

U.S. PATENT DOCUMENTS

| | | | |
|---|---|---|---|
| 4,399,622 A * | 8/1983 | Howard | B01D 29/03 |
| | | | 209/250 |
| 4,540,487 A | 9/1985 | Johnson et al. | |
| 4,919,805 A | 4/1990 | Johnson | |
| 6,073,779 A * | 6/2000 | Shea | B01D 17/0214 |
| | | | 210/241 |
| 7,833,424 B1 | 11/2010 | Baumann et al. | |
| 7,993,532 B2 | 8/2011 | Baumann et al. | |
| 2004/0124158 A1 | 7/2004 | Smith et al. | |
| 2012/0091065 A1 | 4/2012 | Xia et al. | |
| 2013/0105415 A1 | 5/2013 | Xia et al. | |

FOREIGN PATENT DOCUMENTS

| | | |
|---|---|---|
| JP | 2012-101204 A | 5/2012 |
| WO | 2006102022 A2 | 9/2006 |

OTHER PUBLICATIONS

Aqua MiniDisk: Cloth Media Filter, Aqua-Aerobic Systems, Inc., 2012, pp. 1-2, Loves Park, United States.
Aqua-Aerobic: Cloth Media Filters, Aqua-Aerobic Systems, Inc., 2011, pp. 1-6, Loves Park, United States.
ISO-Disc Modularization Concepts, Alfa Laval, at least as early as Dec. 31, 2013, pp. 1-20, Lund, Sweden.

\* cited by examiner

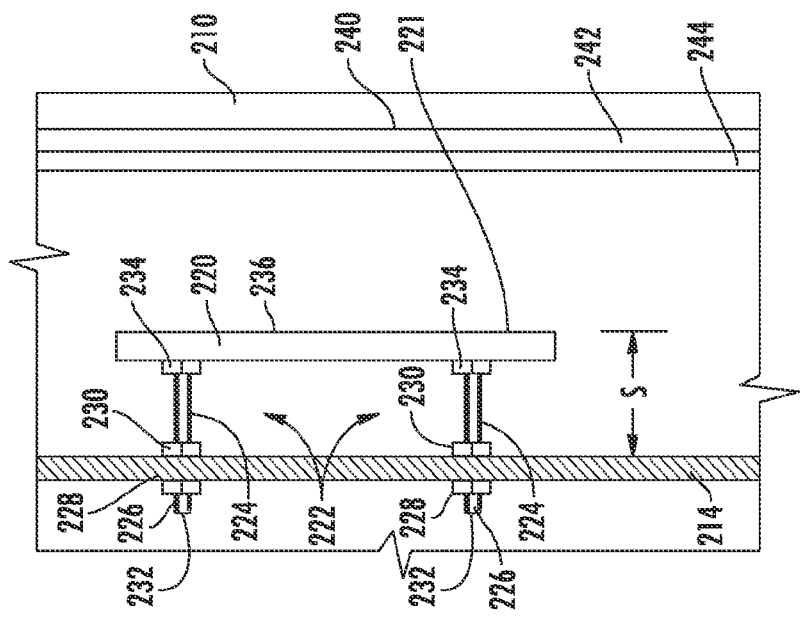
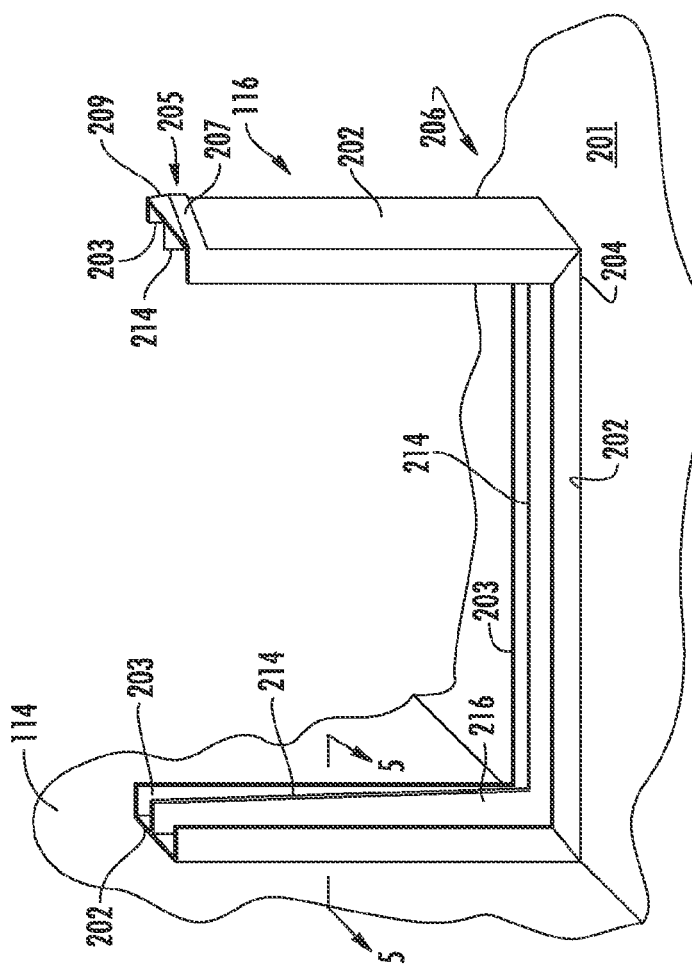
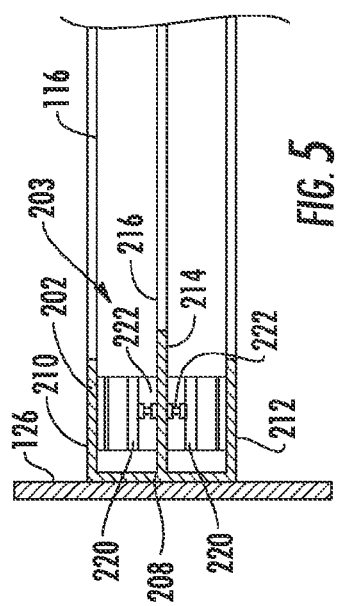
FIG. 4
FIG. 5
FIG. 6

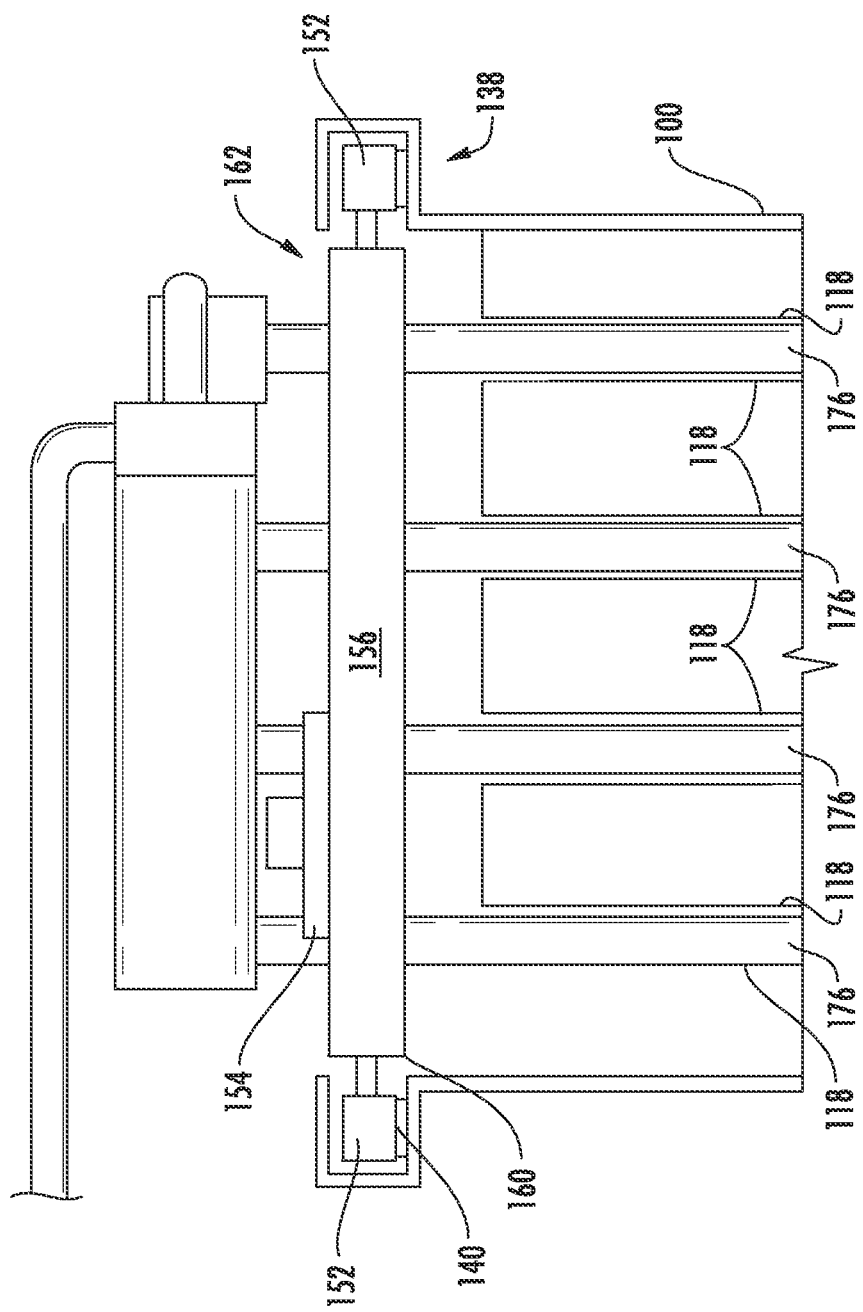

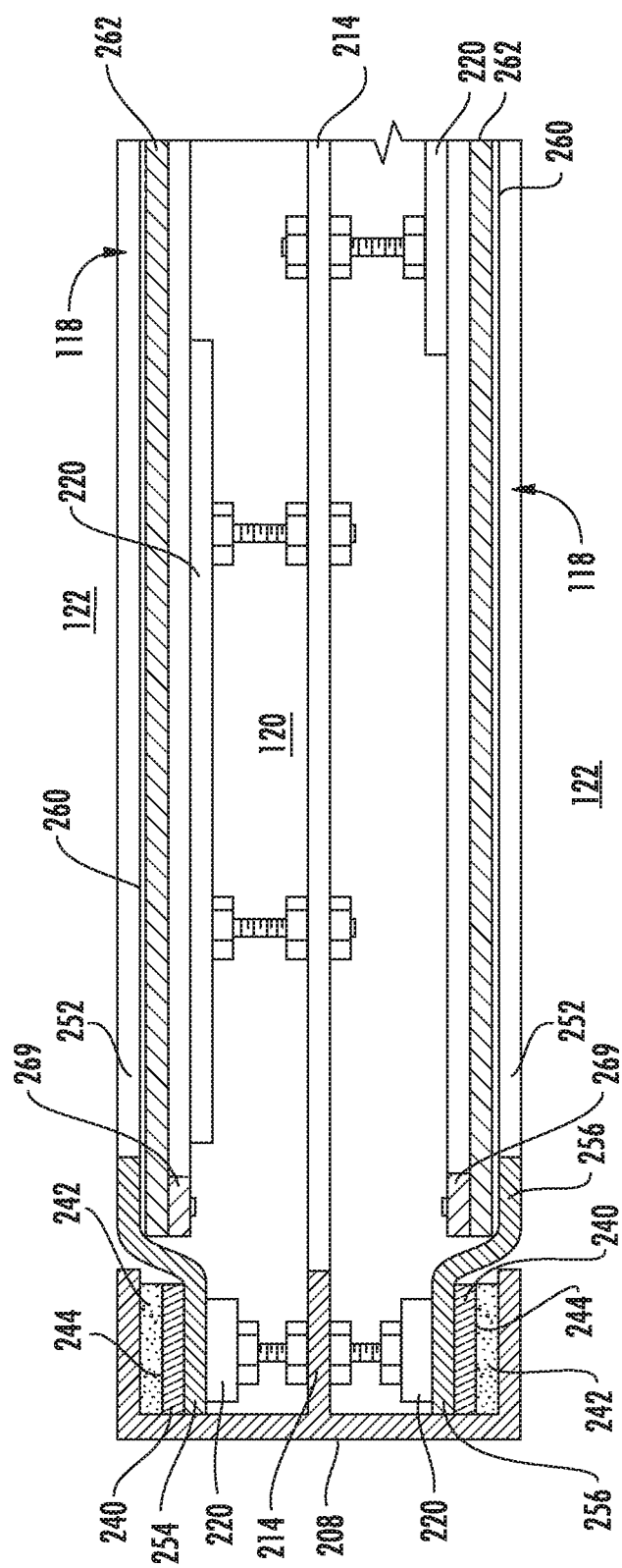

DISK TYPE FILTERING APPARATUS

BACKGROUND

Field

The present disclosure is related to filtration systems, and more particularly, to filtration systems in which a filter media extends across an influent/effluent interface, to filter out particulates, solids, and other entrained materials from the fluid as the fluid passes through the filter media, such fluid including water being treated in a wastewater treatment facility. More particularly still, the present disclosure is related to improved filtration systems having enhanced serviceability, smaller footprint, fewer individual unique parts, and which can be backwashed for cleaning of the filter media without taking the filtration system offline.

Description of the Related Art

Filtration systems are commonly employed to treat wastewater or other fluids to remove (filter) entrained materials therefrom. Such systems may include a plurality of individual filter manifolds or plenums, having a filter media mounted thereto covering an opening therein, typically on the exterior of the manifold or plenum, interposed between the influent and effluent side of a fluid stream in a tank or other enclosure such as an in-ground basin or other containment volume. In these systems, each manifold or plenum includes an opening therein which is covered by the filter media, an interior volume through which filtered (effluent) fluid may flow, and an effluent opening from which filtered fluid exits the manifold or plenum for further processing or reuse. The manifold or plenum and filter media together is often termed a "disk".

In one construct, the manifolds are box like enclosures having an opening on each of the opposed sides thereof which is covered by the filter media. These structures may be located, side by side with a gap therebetween, such that the filter media on the exterior of two adjacent manifolds may face each other across an area of fluid influent extending therebetween, wherein the fluid influent may pass through each filter media and thus be filtered thereby, and thence into the interior of two different and adjacent box-like manifolds, and thence to an effluent exhaust channel. Each manifold includes an effluent outlet extending from the underside thereof, which is sealingly coupled to an effluent master drain extending along and above the base of the tank in which the manifolds are installed. In these apparatus, fluid filtration is a function of gravity, i.e., the effluent exit of the tank is at a height lower than the level of the influent in the tank, and thus, the fluid flows from the influent to effluent sides of the tank without the need for dedicated fluid pumps to pump the fluid being filtered through the filtering apparatus. However, in these systems the piping to remove the filtered effluent is located below the filter media boxes, adding height and complexity to the system and requiring a deeper tank or other enclosure volume.

Over time, the filtered particulates which are captured by the filter media, commonly called filter "cake", is of sufficient density, thickness or quantity on and in the filter media that the gravity head of fluid required to maintain a desired flow quantity from the influent to effluent side of the tank is undesirably increased.

To maintain an acceptable hydraulic profile through the filter, a cleaning device commonly called a "backwash shoe" is passed over the surface of the filter media to remove, by flowing fluid into the backwash shoe in the immediate vicinity of the filter media surface, the filtered particulate material from the surface of the filter media. Such a backwash shoe is passed over the filter media in situ, i.e., during the flow of fluid through the filtering media, to restore the filter media to close to the original, clean, condition thereof. The shoe may be single sided, and thus remove filtered particulates from the filter media on only one side of the manifold disk, or may be double sided, i.e., have openings on the opposite sides thereof, to simultaneously remove filtered particulates from the facing filter media on two adjacent manifolds. However, at the first and last manifold of a plurality of spaced, generally parallel, manifolds, only one surface exists from which the backwash shoe can remove the filtered particulates, i.e., the filter surface at these locations does not face another manifold, but instead faces the wall of the tank. As a result, a backwash shoe having different flow properties than the double sided backwash shoe is needed to remove the accumulated particulates at these locations, which can lead to undesirable hydraulic imbalances in the filter unit. Additionally, the backwash shoe is often spring loaded to be pushed into the filter media as it scans the filter media, which can cause wear to, and premature replacement of, the filter media.

SUMMARY

In an aspect hereof, a disk type fluid filtering apparatus for the filtration of entrained material in a fluid stream such as water, is provided. The filtering apparatus includes a backwash pump, a tank at least partially surrounding an inner volume, the tank comprising a fluid influent inlet, and a fluid effluent outlet, and a base; a first filter media disposed within the inner volume and disposed to separate the fluid influent inlet from the fluid effluent outlet such that fluid flows therethrough from the fluid influent inlet to the fluid effluent outlet; and a backwash shoe movable with respect to the tank and an influent side surface of the first filter media, wherein the backwash shoe comprises an inner conduit, a first side opening, and an end opening, wherein the inner conduit forms a passageway in communication with the backwash pump and a portion of the inner volume disposed between the backwash shoe and the first filter media via the first side opening when the backwash shoe is positioned adjacent the first filter media, and wherein the inner conduit also forms a passageway in communication with the backwash pump and a portion of the inner volume disposed between the backwash shoe and the base of the tank via the end opening.

In a further aspect, the backwash shoe of the fluid filtering apparatus extends from an upper portion of the tank to a position adjacent to the base of the tank. The backwash shoe may have a cylindrical shape, and may be formed as part of the traveling backwash unit, and wherein the travelling backwash unit is arranged to provide translational movement of the backwash shoe relative to the tank.

In a further aspect, the end opening in the backwash shoe is a round aperture. Alternatively, the end opening may be configured as a slot having an aspect ratio of at least two. The longer direction of the slot may be disposed perpendicular to a movement direction of the backwash shoe along the first filter media. The end opening is arranged in a distal position of the backwash shoe, and wherein the distal portion is disposed a predetermined distance from the base of the tank.

In a further aspect, the inner conduit forms an open connection between the first side opening and the end opening.

The fluid filtering apparatus may apparatus may include a second filter media arranged in a parallel spaced relationship to the first filter media, wherein the backwash shoe is moveable in between the first filter media and the second filter media, simultaneously along the first and the second filter media. The backwash shoe comprises a second side opening, and wherein the inner conduit forms a passageway in communication with the backwash pump and a portion of the inner volume disposed between the backwash shoe and the second filter media via the second side opening.

In an additional aspect, an apparatus for filtering a fluid stream, includes a tank having a fluid influent inlet and a fluid effluent outlet and a boundary wall separating the fluid influent inlet from the fluid effluent outlet, a plurality of influent volumes and a plurality of effluent volumes arranged side by side in parallel to one another, and a tubular member, wherein; at least one of said plurality of influent volumes is disposed between, and fluidly communicable with, one effluent volume of said plurality of effluent volumes to either side thereof through a filter media, the plurality of effluent volumes extending from an influent region to the boundary wall; wherein each effluent volume is arranged in fluid communication with the effluent outlet through a separate opening in the boundary wall; wherein the influent volumes are arranged in fluid communication with the fluid influent inlet; and wherein the tubular member has an outer wall and terminates in a lower end portion disposed adjacent to a base of the tank, the tubular member having at least a first vertical opening extending through the outer wall and being disposable adjacent to the filter media, and having at least one end opening in the lower end portion and being located adjacent to the base of the tank.

The tubular member may include a second vertical opening therein disposed through the outer wall in a position opposite to the first vertical opening. The end opening in the lower end portion of the tubular member is a round aperture or a slot.

In operation, the apparatus may comprise a travelling backwash unit, the tubular member forming part of the travelling backwash unit, wherein the travelling backwash unit is configured to move the tubular member along the filter media in the tank. The tubular member may be fluidly connected to a pump. The pump is fluidly connected to a waste line extending outwardly of the apparatus. Additionally, the travelling backwash unit may include a number of further tubular members suspended from a transverse frame of the travelling backwash unit, each tubular member being fluidly connectable to the pump through a valve, the valve being configured to selectively fluidly connect one or more of the tubular members to the pump.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 4 is a perspective view of a channel frame used to secure one or filter plates therein;

FIG. 5 is a sectional plan view of a portion of a channel frame showing the securing system for securing filter plates located in the tank of a filtering apparatus;

FIG. 6 is a partial plan view of a channel frame disposed on the base of the tank showing the details of the securing system for securing filter plates in the channel frame;

FIG. 8 is a partial sectional view of the tank of the filtering apparatus, showing the travelling backwash unit disposed on the tank and the backwash shoes extending inwardly thereof;

FIG. 11 is a partial sectional view of the channel frame, showing the filter plate of FIG. 9 removably secured therein;

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Filter Tank

Figure 1:
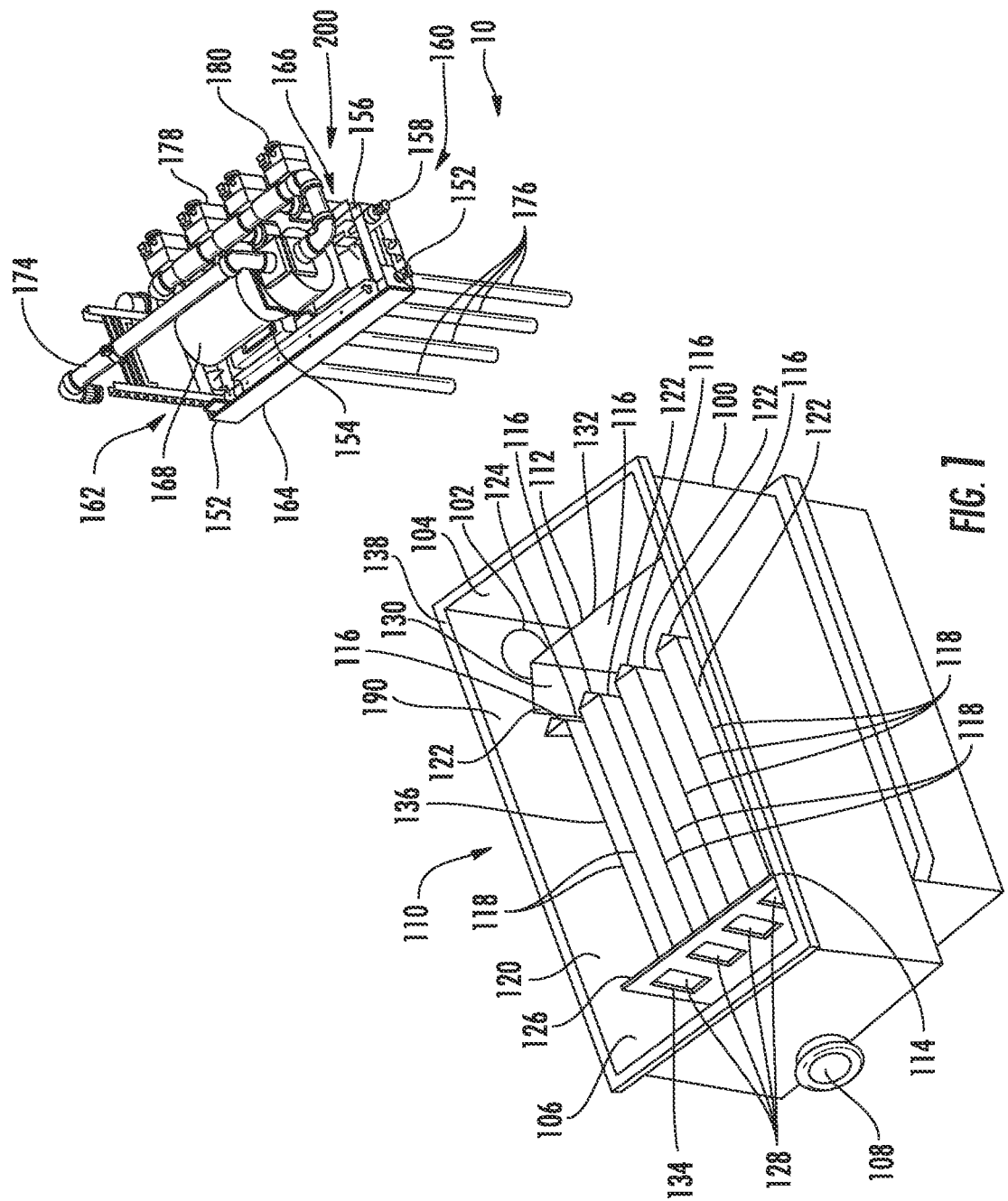
FIG. 1 is a perspective, partially exploded view, showing the main components of a filtering apparatus hereof, with the travelling backwash system thereof removed from the tank and spaced therefrom.

Referring initially to FIG. 1, a partially exploded view of a filtering apparatus 10, having as the primary components thereof a containment volume such as a tank 100 in which filtering operations occur to remove particulates from a fluid stream passing through the tank, and a travelling backwash unit 200 which is periodically moved across the tank to clean the filter media thereof, is shown, with the travelling backwash unit shown spaced from and exterior of the tank 100, so the internal features of the tank 100 may be shown. In the embodiment shown and described, the containment volume is an above ground tank 100, although other containment volumes, such as an in-ground basin, including concrete lined in-ground basins, may be employed. Tank 100 generally includes a fluid influent inlet 102 through which influent fluid, to be filtered, enters tank 100 and flows into an influent cavity 104 thereof, an effluent cavity 106 into which filtered fluid passes after having the particulates filtered therefrom, and an fluid effluent outlet 108 leading from the effluent cavity 106 and out of tank 100. Intermediate of influent cavity 104 and effluent cavity 106 is filtration region 110, which is bounded at the influent side thereof by inlet weir 112, and at effluent side by boundary wall 114. Although the embodiments herein are described with respect to a tank 100 through which the liquid being filtered is flowing, the methods and apparatus hereof are equally applicable to a fluid basin such as an in-ground basin. Additionally, a weir is not necessarily required, and may be omitted.

Figure 2:
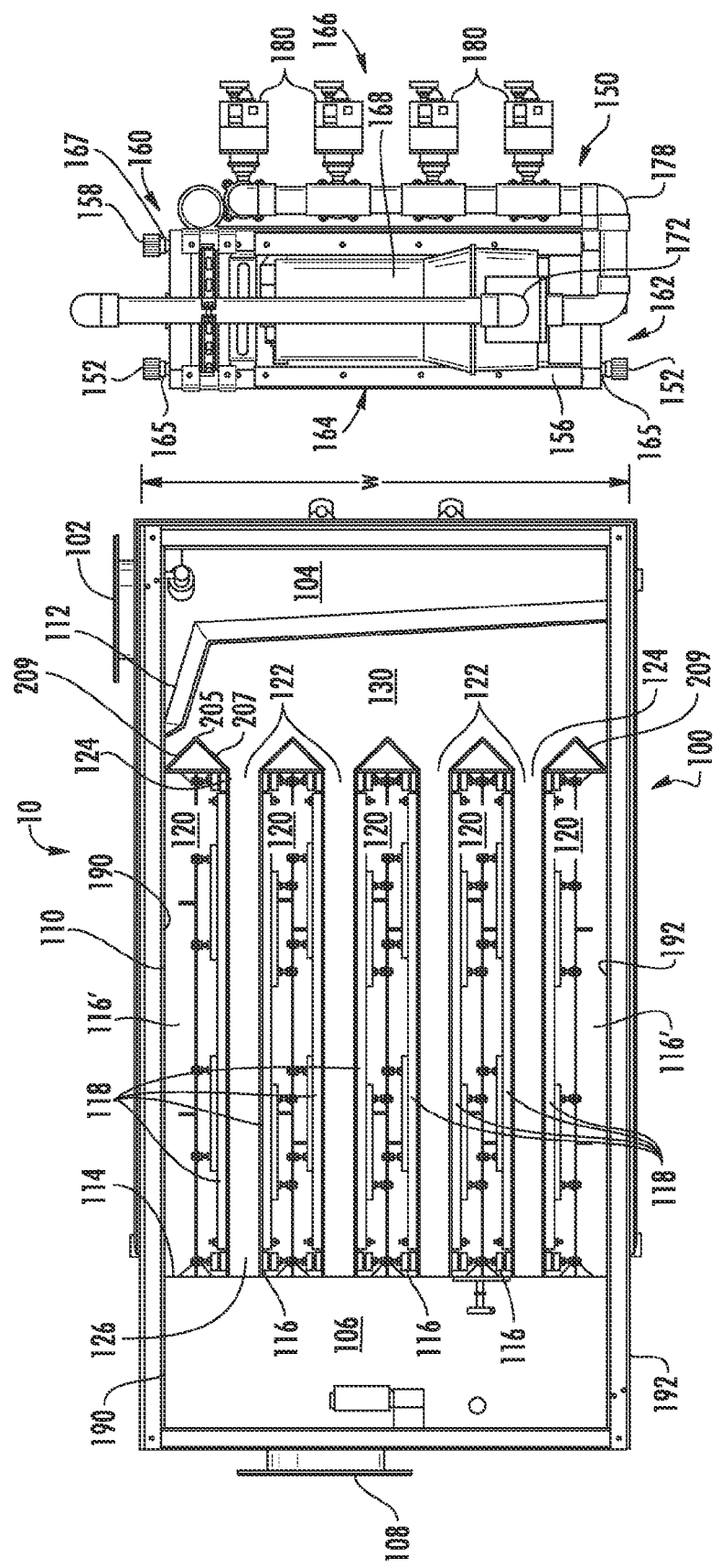
FIG. 2 is a plan view of the filtering apparatus of FIG. 1, showing the travelling backwash system thereof removed from the tank and spaced therefrom.

Referring now to FIGS. 1 and 2, within filtration region 110 of the tank 100, a plurality of generally planar filter plates 118 extend, in spaced parallel relation to one another, from the boundary wall 114 and generally perpendicular thereto and in the direction of the inlet weir 112. Individual ones of the filter plates 118 are slidingly received within channel frames 116 secured to the base and boundary wall 114 of the tank, so as to form a plurality of spaced, generally aligned in parallel and interleaved with one another, influent volumes 122 and effluent volumes 120, separated from one another along the length direction of the tank 100 by the filter plates 118. Each influent volume 122 has an opening end 124 facing the inlet weir 112, and a second end 126 which is bounded by boundary wall 114, and has a depth defined by the height of the filter plates 118 on either side thereof. Individual openings 128 in boundary wall 114 (FIG. 1) are each physically aligned with and fluidly coupled to a single one of the effluent volumes 120 to allow filtered fluid to pass from the effluent volume 120 and into effluent cavity 106, and then from the tank 100. A backwash shoe storage recess 130 is provided intermediate of the open end 124 of each of the influent volumes 122 and the inlet weir 112. The top 132 of the inlet weir 112 extends a distance from the base of the tank that is lower than the height of the top 134 of the boundary wall 114 and the uppermost extension of the tops 136 of the filter plates 118 from the base of the tank 100. Hence, fluid to be filtered, such as waste water having particulates therein, flows into the influent cavity 104 through the inlet 102, over inlet weir 112 into influent volumes 122, whence it flows, by gravity, through the filter plates 118 where particulates therein are filtered from the fluid, and thus into the effluent volumes 120. From the effluent volumes 120, the filtered fluid flows out of openings 128 and into effluent cavity 106, and then out of the filtering apparatus tank 100 through fluid effluent outlet 108 located adjacent to the base of the tank 100 and thus below the top of weir 112.

Figure 19:
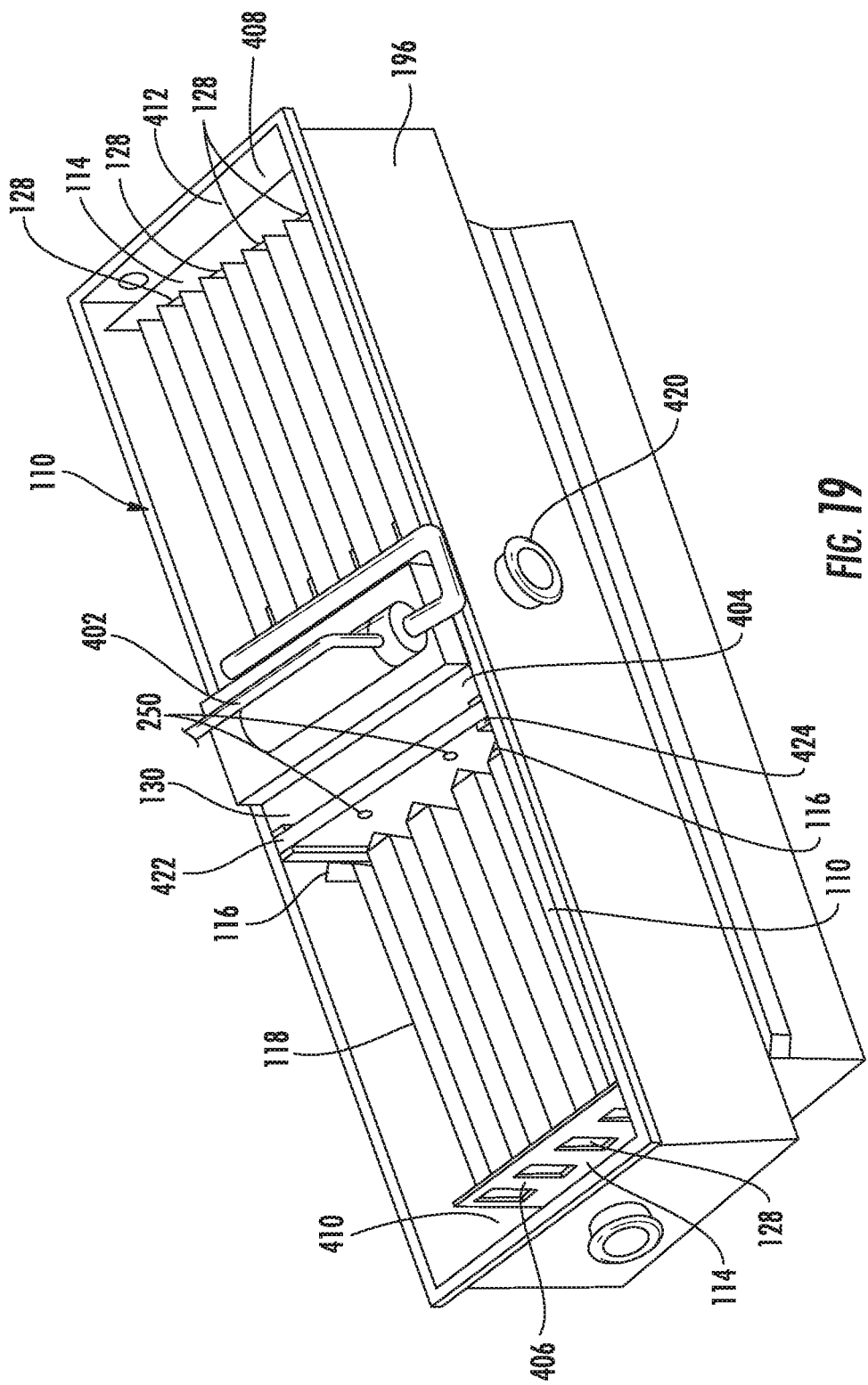
FIG. 19 is a perspective view of an additional filtering apparatus, wherein an additional filtering region has been added.
Figure 22:
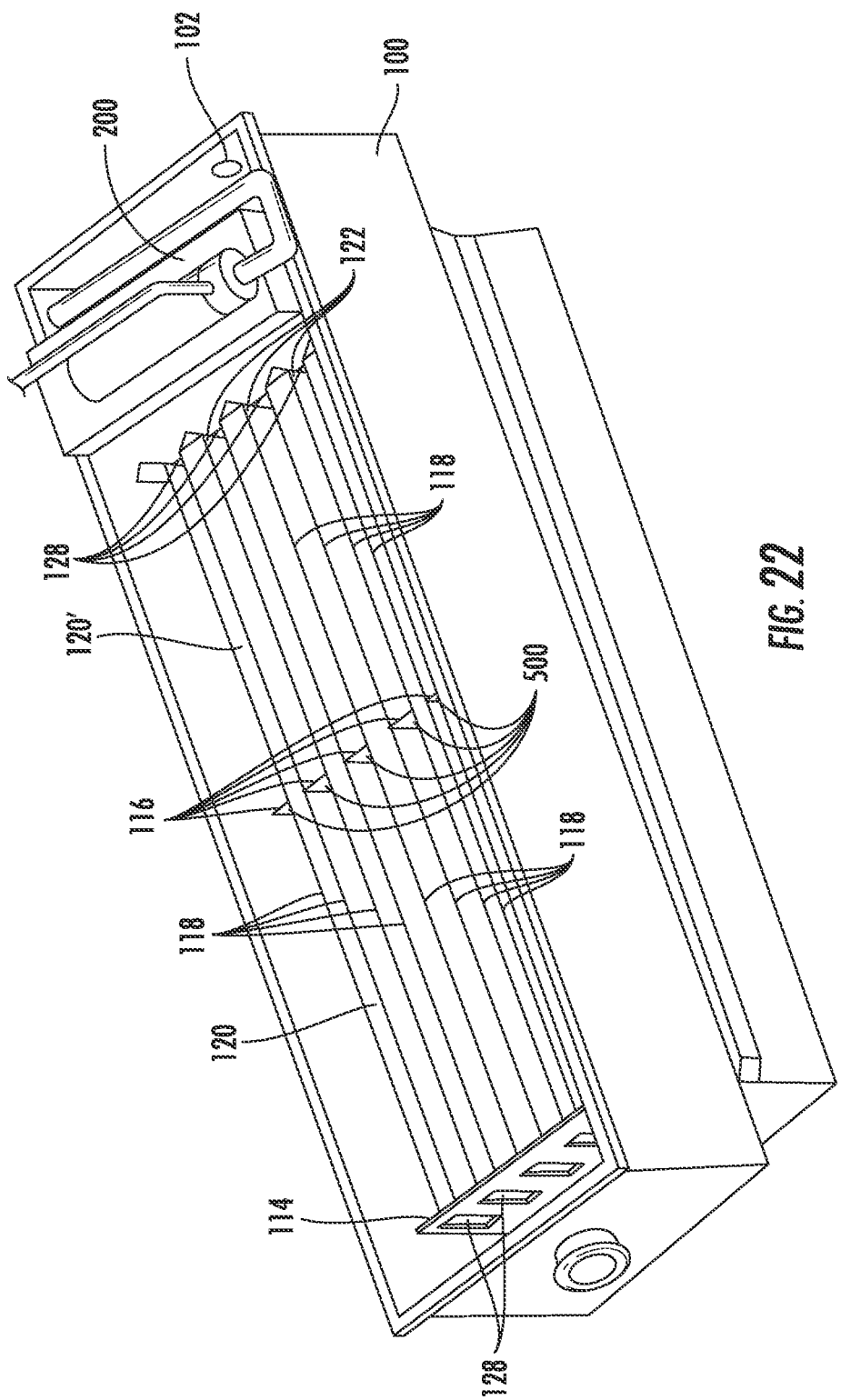
FIG. 22 is a perspective view of an alternative construct of a tank or basin employing the filter plates and channel frames hereof.

In the embodiment hereof shown in FIGS. 1 and 2, four influent volumes 122 and five effluent volumes 120, defined by five channel frames 116, are shown. However, the modularity enabled by using channel frames 116 and filter plates 118 to form influent volumes 122 and effluent volumes 120 can be exploited with larger or smaller numbers of channel frames 116 shown in the spaced relationship thereof in FIG. 2. For example, ten or more channel frames 116 may be disposed in a parallel spaced relation as are the five channel frames 116 of FIG. 2, or, alternatively, as shown in FIGS. 19 and 22, multiple filtering regions 110 may be established in a single tank, and each filtering region 110 have the channel frames in a spaced, parallel arrangement. The size of the channel frames, and the number of channel frames, is a design selection within the scope of one of skill in the art. In particular, the number of channel frames 116, and the size of the filter plates 118 and thus of the filtering capacity of each filter plate 118, may be optimized for original build cost, cost of ownership, or freedom of operation.

Backwash Unit

Figure 18:
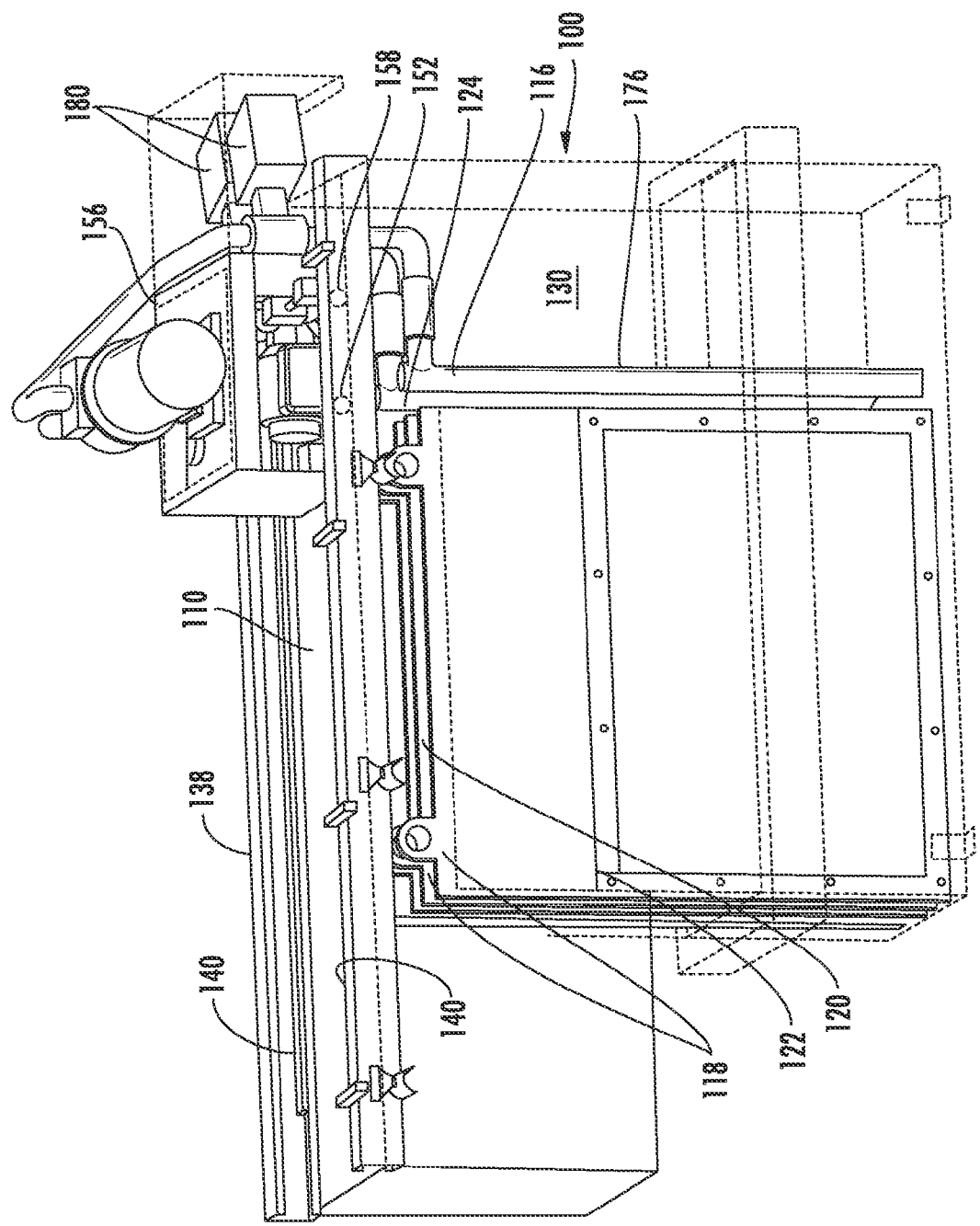
FIG. 18 is a perspective view of the filtering apparatus, showing the tank in phantom to show the positioning of the travelling backwash unit therewith.

As will be described in more detail herein, and referring now to FIGS. 1, 2 and 8, the travelling backwash unit 200 is configured to move across the tank 100, wherein individual backwash shoes 176 thereof move inwardly of each of the influent volumes 122, such that diametrically opposed openings in these backwash shoes 176 are in facing, adjacent, relationship with the filter plates 118. As best shown in FIG. 18, the upper rim 138 of the tank 100 includes a recess disposed inwardly of either side thereof, extending generally parallel to the alignment direction of the filter plates 118, within which is provided a gear rack 140 on which the travelling backwash unit 200 is supported for movement thereof across the tank 100. Gear rack 140 is configured to be engaged by driven pinion gears 152 on the travelling backwash unit 200, such that a motor 154 within travelling backwash unit 200 may rotate the driven pinion gears 152 to engage teeth in the rack 140 and thereby traverse the travelling backwash unit 200 across the top of tank 100. Other movement mechanisms, such as travelling cranes, linear slides, or mechanism exterior to the tank 100 may also be used to move the travelling backwash unit 200 across the tank 100.

Referring to FIG. 2, travelling backwash unit 200 generally includes a transverse frame 156 extending over slightly less than the width direction W of the tank, which is supported on the gear rack 140 by the driven pinion gears 152 extending from the opposed sides 160, 162 thereof, as well as by a pair of opposed idler gears 158 (second idler gear 158 shown in FIG. 1), having the same construct as the driven pinion gears 152, but not driven by motor 154, which also extend from opposite sides 160, 162 of the transverse frame 156 and are located with respect to the pinion gears 152 such that the pinion gears 152 are located adjacent a first, effluent, side 164 of the transverse frame 156 and the idler gears 158 are disposed adjacent a second, influent, side 166 of the transverse frame 156. An output shaft 165 of the drive motor 154 extends in opposite directions from the drive motor 154 and outwardly of the opposed sides 160, 162 of the transverse frame 156, to each of the pinion gears 152. The output shaft 165 is supported at the sides of the transverse frame 156 in bearings. Each of the idler gears 158 is likewise supported on a shaft 167 extending across and outwardly of the ends 160, 162 of the transverse fame 156, which is likewise supported in a bearing on the frame 156. Rotation of the pinion gears 152 causes lateral movement of the travelling backwash unit 200 on the rack 140 and thus across the top of the tank 100 to thereby pass individual backwash shoes 176 suspended therefrom over the length of the filter plates 118, i.e., from the opening ends 124 to second end 126 adjacent to the boundary wall 114.

Travelling backwash unit 200 further includes a pump 168, having a pump inlet fluidly coupled through process piping 178 to the plurality of backwash shoes 176 which hang below, and are supported from, the transverse frame 156. A backwash waste line 174 extends from pump outlet 172 to return fluid carrying filtered particulates removed from the filter plates 118 on the influent side thereof for further processing, such as settling in a settling tank (not shown) or reentry into a water filtration plant. Each backwash shoe 176 is fluidly coupled to the process piping 178 through a valve 180, which is selectable to open or close fluid communication between the backwash shoe 176, the pump 168 and the process piping 178, and thus cause fluid to flow inwardly of the backwash shoe 176 to enable backwashing operation therewith. In the embodiment, the valves 180 are electronic valves. Although a single valve 180 is shown coupled to a single backwash shoe 176 in FIGS. 1 and 2, it is contemplated herein that a plurality of shoes, up to four backwash shoes 176, may be fluidly coupled to the process piping through a single valve 180 and thus configured to simultaneously operate in a backwashing mode. A configuration having two valves coupled to four backwash shoes is shown in FIG. 18.

Figure 3:
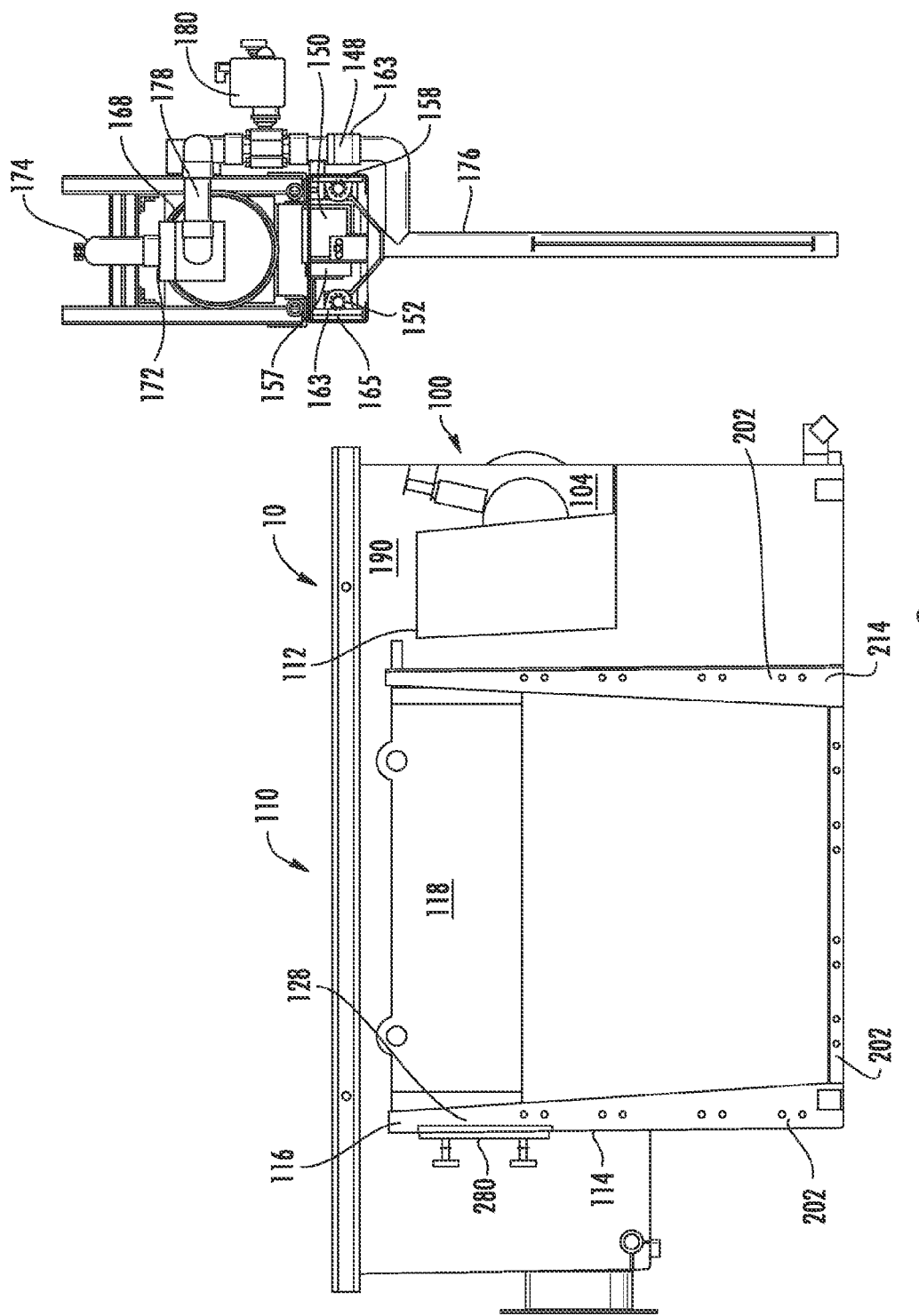
FIG. 3 is a side view of the filtering apparatus of FIG. 1, showing the travelling backwash system thereof removed from the tank and spaced therefrom.
Figure 14:
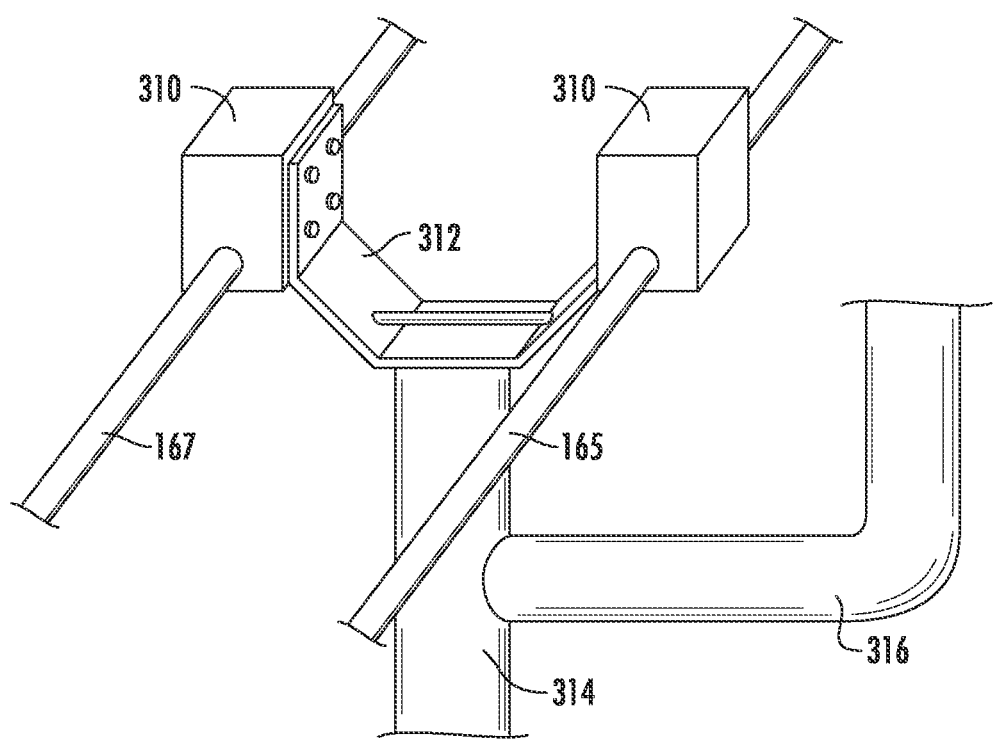
FIG. 14 is an enlarged view of a portion of the travelling backwash unit, showing the sliding attachment of a backwash shoe therewith.

The backwash shoes 176, as will be described further herein, are suspended from the transverse frame 156 on sliding blocks 310 forming linear bearings, which are configured to slide on the output and idler shafts 165, 167 for the gears 152, 158, as shown in FIG. 14. The sliding direction of the backwash shoes 176 is transverse to the motion of the transverse frame 156 when the transverse frame 156 moves across the top of the tank 100. To accommodate this sliding motion of each backwash shoe 176 but maintain a sealed fluid coupling of the backwash shoe 176 to the process piping 178, a flexible coupling, such as a rubber or other elastomeric sleeve 148 as shown in FIG. 3, connects each backwash shoe 176 to the process piping 178. As a result, the shoe 176 may slide along the drive shafts 165, 167 in the transverse frame 156, with the sleeve bending to accommodate that movement at the connection thereof to the process piping 178, and thus move toward and away the filter media as the backwash shoe 176 traverses opposed filter media.

The Filtration Region

Referring again to FIGS. 2 and 3, a plan view and a sectional view of tank 100 are shown. In the central region of the tank 100 depicted in FIG. 2, the arrangement of the channel frames 116 and the filter plates 118, together forming the filtration region 110 of the apparatus 10 and bounding the influent volumes 122 and the effluent volumes 120, are shown. Tank 100 includes opposed side walls 190, 192, between which extends boundary wall 114. Extending in the direction of the inlet weir 112 from the boundary wall 114 are a plurality of channel frames 116 each of which is configured to hold and secure, but enable sliding placement and replacement of, one or two individual filter plates 118 therein. Filter plates 118 are configured to be removable from the channel frames 116, and when in place within the channel frames 116, fluid may flow through filter media disposed therein to remove particulates from the fluid passing through the filtering apparatus 10.

Figure 17:
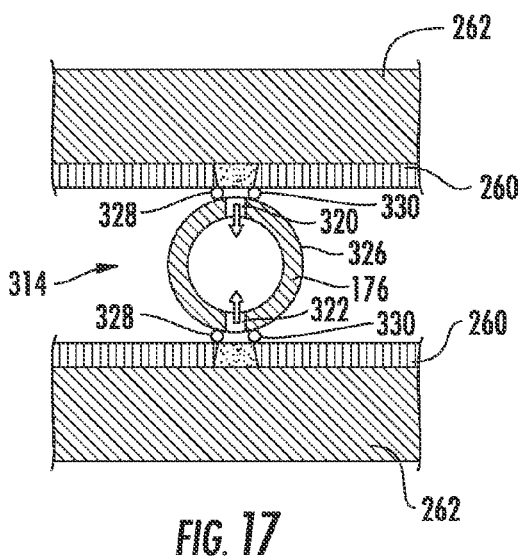
FIG. 17 is a sectional view of the backwash shoe of FIG. 16 at section 17-17.

Referring now to FIGS. 3 to 5, each channel frame 116 includes three channel members, comprising a base channel attached to and having an open side thereof extending from the base of the tank 100, and two side channels extending generally normal to, and upwardly from, the base of the tank 100, together forming three sides of a box-like structure, each channel having an open side thereof facing inwardly of the structure. As best shown in FIG. 4, the channel frame 116 so composed comprises a plurality of generally E-shaped (in section) thin walled members 202, wherein opposed thin walled members 202 extend upwardly from a thin walled member 202 affixed to the base 201 of the tank 100 to form an open topped frame. A first thin walled member 202 is affixed to, and extends upwardly from the base 201 of the tank 100 along the boundary wall 114, such that an open region 203 of the first thin-walled member 202 faces in the direction of the inlet weir 112. A second generally thin-walled member 202 is affixed to the base 201 of tank 100 and extends along the base 201 from the boundary wall to a position adjacent to, but spaced from, inlet weir 112 with the open region 203 thereof on the side thereof facing away from the base 201. A third thin walled member 202 extends upwardly from base 201 from the terminus 204 of the channel frame 116 on the base at the end 206 thereof distal from the boundary wall 114, with the open region 203 thereof facing the boundary wall 114. The three thin-walled members 202 thus combine to form three sides of a box like structure, open at the top and extending from the base 201 of the tank 100 to a position above the top 132 surface of the weir 112, for receipt of filter plates 118 therein, and removal of filter plates 118 therefrom. Referring to FIG. 2, the spaces between adjacent channel frames 116 form the influent volumes 122 therebetween when filter plates 118 are positioned within the channel frames 116. During cleaning of the filter media of the filter plates 118, backwash shoes 176 are guided into the influent volumes 122 and thus positioned to remove accumulated particulates from the surface of the filter media of the filter plates 118 (FIG. 17). If the backwash shoes 176 are misaligned with the opening ends 124 of the influent volumes 122, one or more of the shoes 176 may jam against a portion of the end of the channel frame 116 during movement of the backwash shoes 176 into the influent volumes 122. Thus, as shown in FIGS. 2 and 4, a bumper 205 comprised of opposed projecting tabs 207, 209 extends outwardly from the upper end of each channel frame 116, at the location thereof disposed closest to weir 112, to guide the backwash shoe 176 into the opening 124 of the influent regions 122.

Referring to FIG. 5, which is a sectional view of a portion of the channel frame 116 of FIG. 4 at section 5-5, each thin-walled member 202 of the channel frame 116 includes a base 208 and opposed sides 210, 212 extending outward from opposed ends of the base 208. A center web 214 extends outwardly from, and generally perpendicular to, the base 208 and generally parallel to the sides 210, 212, and intersects the base 208 generally at the center thereof between the two sides 210, 212. In the thin walled members 202 extending upwardly from the base 201 of the tank 100, a tapering wall 216 which extends further from the base 208 of the E-shaped channel forming the thin walled member 202 adjacent to the base of the tank 100 than at the top of the sides of the channel frames 116 is provided. This configuration of the web 214 increases stiffness of the channel frame 116 structure. The web 214 in the thin walled member 202 affixed to the base 201 of the tank generally extends the same distance from the base 208 of the thin walled member 202 as the sides 210, 212 thereof, i.e., it is not tapered. Where the individual thin walled members 202 forming the channel frame 116 join, they are connected by being brazed or welded together. The thin walled members 202 are preferably configured of steel, such as stainless steel, or a metal such as steel which is coated with a protective layer thereon. The thin walled members 202, including the webs 214, may be extruded as a single piece and the web 214 cut or ground to the desired height and profile from the base 208. The thin walled members 202 may be extruded as a single U-shaped piece and the web 214 formed by welding sheet stock to the base generally midway between the opposed sides 210, 212 thereof. Additionally, at the tank base 201 and boundary wall 114 the second thin walled member 202 may be omitted, and material forming the opposed sides 210, 212 and the web 214 are secured, such as by welding, directly to the surfaces of the boundary wall 114 and base 201 of the tank 100 to form the channel frame 116 at those locations.

Figure 7:
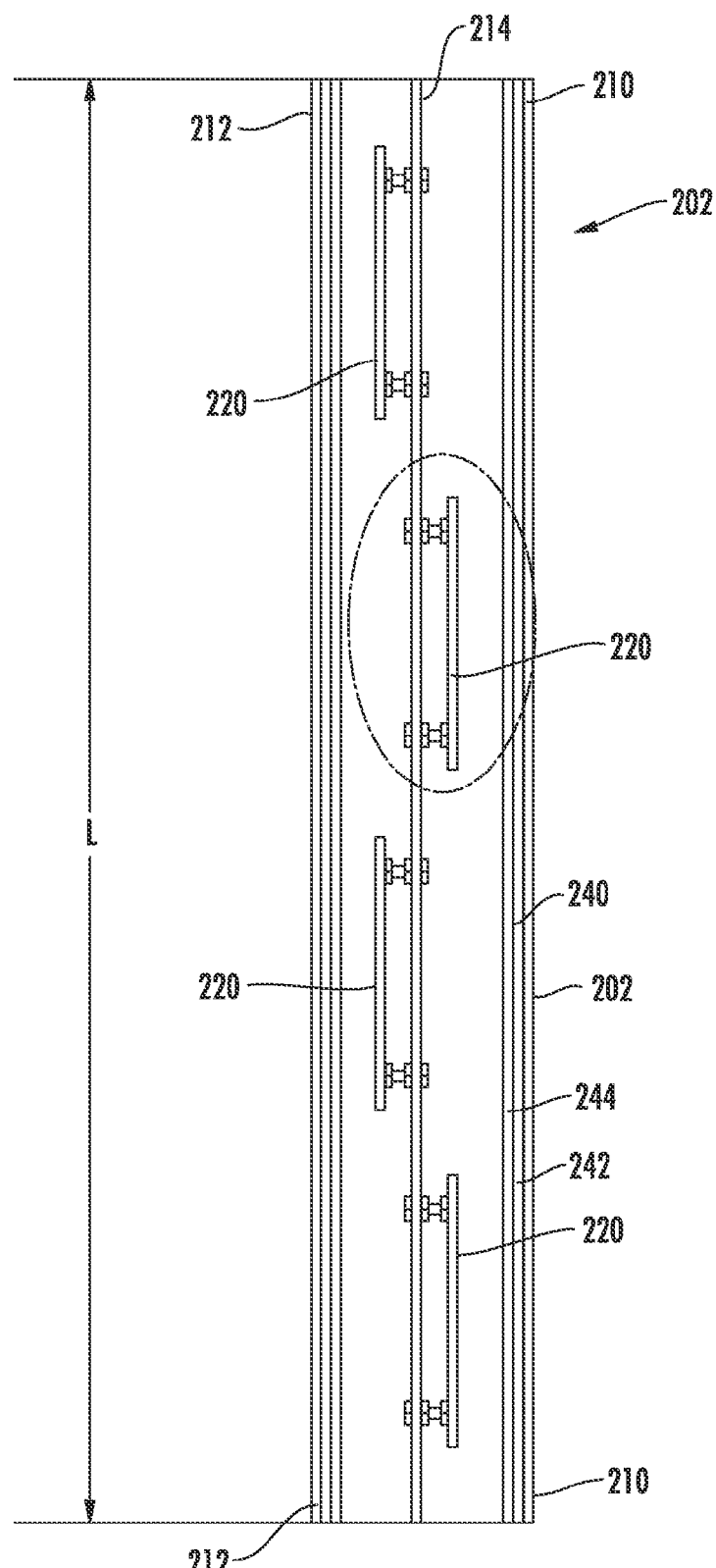
FIG. 7 is an enlarged view of a portion of the channel frame shown in FIG. 6.

The webs 214 in the thin-walled members 202 are provided for locating a securing system for releasably securing the filter plates 118 in the channel frames 116. Referring to FIGS. 5 to 7, the securing system includes a plurality of bias plates 220, each of which are provided on standoffs 222 extending from web 214 in opposite directions and staggered along the length of the thin walled members 202. As shown seen in FIG. 7, each standoff 222 includes a pair of threaded studs 224 spaced in the length direction of the web 214, having a first end thereof 226 extending through a hole in the web 214, and secured in the hole by first nut 228 and second nut 230 threaded over the studs 224 and positioned on either side of the web 214. The studs 224 extend from the web 214 in the direction of an adjacent side 210 or 212 of the thin walled member 202, where they are threadingly received in a nut 234 adhered to a side of bias plate 220.

To attach the bias plates 220 to the web 214, the studs 224 are first threaded and secured into the nuts 234 on bias plates 220, and nut 230 is also threaded thereon to a position adjacent the nut 234. The remaining extending portion of the studs 224 are extended through holes extending through the web 214, and the first nut 228 is threadingly secured thereover on the opposite side of the web 214 as the bias plate 220 which it is securing. The standoff distance S of the engagement surface 221 of the bias plate 220 from the adjacent surface of the web 214, and the distance between the front surface 236 of the bias plates 220 to the adjacent facing surface of sides 210 or 212, is determined and set by the relative position of the stud 224 within nut 234, as well as the relative positions of the first and second nuts 228, 230 on the stud 224 and the length of the extending portion 232 of the stud 224 extending from the web 214.

The securing system also includes a second bias plate 240, located on the inwardly facing surface of sides 210, 212. Second bias plates 240 include a conformable member 242 adhered or affixed to the inwardly facing surface of the sides 210 or 212 of the thin walled members of the channel frame 116, and a solid bar or extended plate-shaped member 244 affixed to the conformable member 242 such that the conformable member 242 is positioned between the side 210 or 212 and the bar shaped member 244. Thus the bar shaped member 244 may move with respect to the side 210 or 212 to which it is connected, as a filter plate 118 is slid between the first and second biasing plates 220, 240 as the filter plate 118 is placed into, or removed from, the channel frame 116 between the biasing plate 220 and second biasing plate 240. Conformable member 242 is a close cell foam material, which in a free state supports and biases the bar shaped member 244 away from the inner wall of sides 210, 212 to which it is affixed, but which may be compressed to allow the bar shaped member 244 to move in the direction of the wall of the side 210, 212 to which it is attached. Filter plates 118, as will be described further herein, include an exterior frame portion 250 having a thickness greater than the free state distance between bias plate 220 and the bar shaped member 244, for example a thickness 3 mm greater than the free state distance between bias plate 220 and the bar shaped member 244. As a result, when the filter plate 118 is positioned in the channel frames 116 as shown in FIG. 2, the bar shaped member 244 is pushed toward the adjacent wall of the side 210, 212, and the conformable member 242 provides a bias to maintain the opposed surfaces of the filter plate 118 against the surfaces of the bar shaped member 244 of the second bias plate 240 and bias plate 220, and thus form a seal against leakage of influent past the facing filter plate frame portion 250 and bar shaped member 244.

As shown in FIGS. 2 and 6, the bias plates 220 are located in a staggered arrangement, such that along the length of the E-shaped members 202, each adjacent bias plate 220 is extending from an opposite side of the web 214. In this embodiment, four bias plates 220 are disposed along the length L of the thin walled members 202, such that two bias plates 220 are spaced from each of the opposite sides of each web 214. This configuration is selected to enable attachment of the bias plates 220 and the standoffs 224 to the web 214 without undo interference from a proximately attached bias plate 220 and standoff 222. Alternatively, in the embodiment shown in FIG. 2, the opposed ends of the second bias plates 220 on either side of the web 214, in the length direction L of the web 214, overlap in position across the web 214 and the length of each second bias plate 220 in the direction L is about twenty percent of the total length L of the W shaped members 202. This overlapping construct provides greater stiffness web 214 when fluid is flowing through a filter plate 118.

The bar shaped members 244 extend the entire length L of the thin walled members 202. By appropriate selection of the thickness and stiffness of the bar shaped members 244 and of the thickness, stiffness, length and location of the bias members 220, and of the elasticity of the conformable member 242, the maintenance of a seal against excess leakage of influent past the facing filter plate frame portion 250 and bar shaped member 244 may be secured, while also enabling placement of, and removal of, filter plates 118 into channel frames 116.

The Filter Plates

Figure 9A:
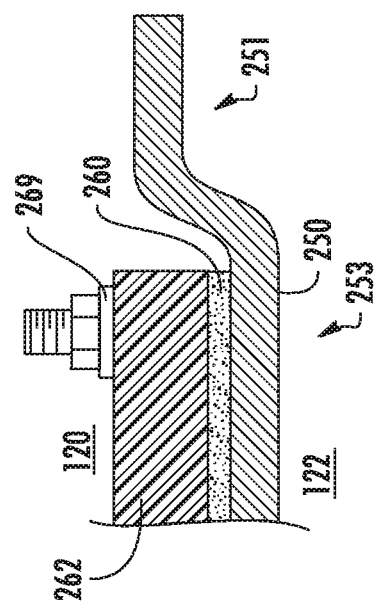
FIG. 9A is a partial sectional view of a portion of the filter plate of FIG. 9.
Figure 9:
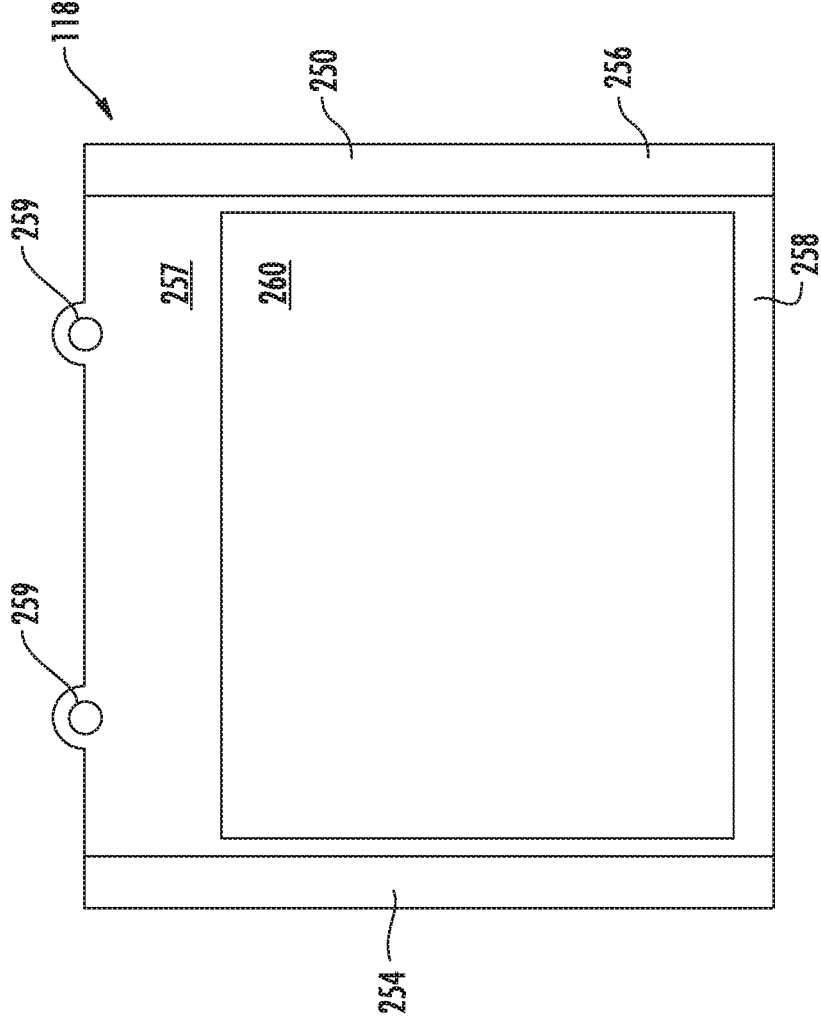
FIG. 9 is a front view of a filter plate used for supporting a filter media used for filtering of fluid streams in the apparatus of FIG. 1.
Figure 10:
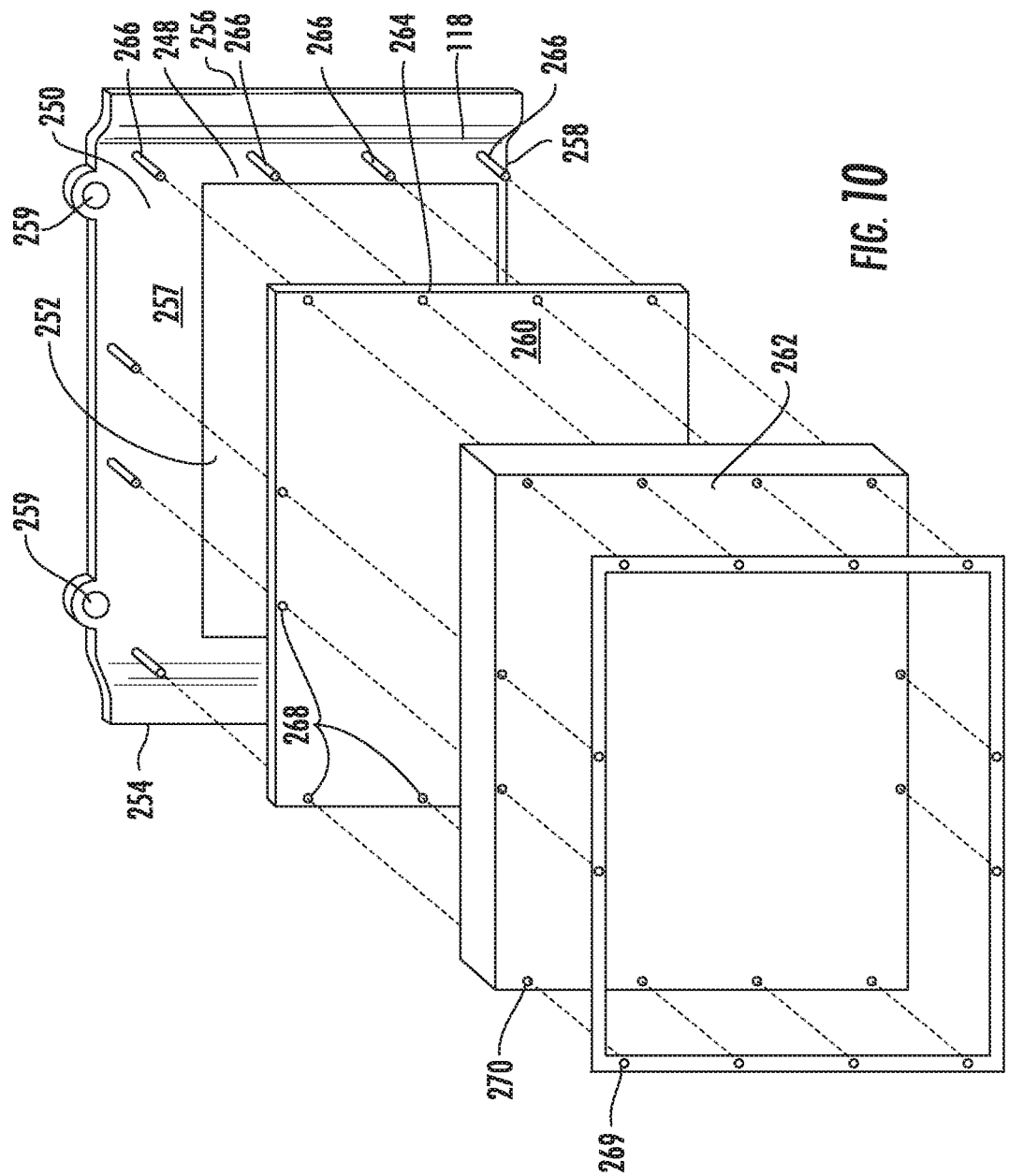
FIG. 10 is an isometric exploded view of the filter plate of FIG. 9, showing the interrelationships of the components thereof.

Referring now to FIGS. 9 and 10, the construct of the filter plates 118 is shown. Each filter plate 118 includes a frame portion 250 having opposed sides 254, 256 header portion 257 and base portion 258 together defining a central, generally rectangular, through opening 252 therethrough. Opposed sides 254, 256 are configured to fit into and span the region between the bias plates 220 and the bar shaped members 244 in the opposed thin walled members 202 of the channel frames 116. Thus, the filter plate 118 is sized and configured to slide into the channel frame 116, such that each of the opposed sides 254, 256 thereof is received between opposed bias plates 220 and second bias plates 240 in a channel frame 116. Two lifting eyelets 259 are provided in the uppermost side surface of the header portion 257. As shown in FIG. 9A, along the perimeter of the sides 254 and 256, and the base 258, the frame portion 250 forms an offset flange 251 such that the main body 253 of the frame portion 250 extends outwardly of the effluent region when the filter plate 118 is assembled. As a result, the filter media 260 is disposed generally coplanar with the exterior of the thin walled members 202 of the channel frame 116, and thus readily accessed by the backwash shoes 176.

Referring again to FIGS. 9 and 10, filter media 260 spans opening 252 in the filter plate, and is located across the opening 252 and exposed to the influent volume 122 at the influent side of the filter plate 118 when the filter plate 118 is located in a frame 116, i.e., the filter media 260 is maintained on the side of the frame portion 250 which faces the effluent volume 120, and at the edges thereof the frame of the filter plate 118 is disposed between the filter media 260 and the influent volume 122, and the filter media 260 spans the opening 252. Filter media 260 used herein is capable of filtering particulates of 5 to 10 microns or larger in diameter, and on each filter plate 118, the size of the filter media 260 exposed to the influent region 122 may range from about 7000 to about 52000 $cm^2$ or more. To secure the filter media 260 in place on the frame portion 250, a stiff, porous, media filter plate 262 is secured thereover to retain the edge region 264 of the filter media 260 between the media filter plate 262 and the region of the frame portion 250 immediately surrounding the opening 252 through the frame portion 250. The filter media plate 262 is a generally stiff member as large as, or larger in area than the filter media, and made of a porous material such as Porex® sintered plastic material, a grating such as an FRP fiberglass matrix, or other support grid. For example, an 18 mm thick plate of the sintered plastic material has sufficient stiffness to maintain the filter media 260 in a condition whereby the pile of the filter media can extend into the influent volume across the opening 252 (not caved inwardly as a result of the fluid pressure exerted on the filter media 260 and filter media plate 262) with minimal head loss and sufficient flow of filtered effluent therethrough. The filter media plate 262 presses the filter media 260 into the opening 252 in the filter plate 118, and the edges thereof extend over the sides 254, 256, header 257 and base 258 of the frame portion 250 adjacent to opening 252. A frame element 269 having an opening of equal, or greater size as opening 252, is located over the media filter plate on the side opposite to the location of filter media 260. To secure the frame portion 250, filter media 260, frame 269 and media filter plate 262 together and properly position the filter media 260 and media plate 262 in opening 252 in the filter plate 118, a plurality of studs 266 extend, from the frame portion 250, through openings 268 in the filter media 260 and hence through openings 270 provided in the media filter plate 262 and the frame element 269. The studs are configured to fully extend from the effluent side face of the frame portion 250, through the filter media 260, the filter media plate 262 and frame element 269 respectively. The stud may be a threaded stud which extends from the influent side surface of the filter plate, and a threaded nut (not shown) may be tightened over the distal end thereof to secure the filter frame portion 250, filter media 260, media filter plate 262 and frame element 269. Alternatively clip type fasteners, expansion bolts, etc., may be used to secure together the frame portion 250, filter media 260, media filter plate 262 and frame element 269.

Herein, the term filter media is used as a general reference to the filter media separating the influent volumes from the effluent volumes, as well as the filter media 260 located in a particular filter plate 118. The latter may also be referred to as a first filter media, a second filter media, etc. Suitable cloth filter media 260 may be woven or nonwoven, and may comprise one layer or may be multi-layered. The material selected for the filter cloth media should have numerous attributes that render the filter cloth media suitable for filtration service, such as structural integrity to withstand the pressure gradients of filtration and backflushing, and chemical resistance to attack or dissolution by the filtered species, filtrate, and chemical cleaning solutions such as chlorine, citric acid, sodium hydroxide, and other chemicals designed to minimize organic and inorganic fouling of the filter cloth media. The material should also have the ability to be fabricated readily into the preselected filter cloth media shape for a particular application. One useful cloth filter material is a nonwoven, needlefelted nylon (polyamide) fiber-based material. The same material in "pile" form is another suitable filter material. "Pile" and "needlefelting", and "needling" are terms of art in the manufacture of nonwovens, and are readily understood by those skilled in the nonwovens art. Piled materials may also be needlefelted. Additional design criteria and considerations in the fabrication and selection of cloth disk filter media are disclosed in Purchas and Sutherland, "Handbook of Filter Media", Elsevier Science Ltd. (2002), which is incorporated herein by reference, and especially Chapters 2 and 3 entitled "Woven Fabric Media" and "Nonwoven Fabric Media", respectively. Patents describing piled and/or needled nonwovens include U.S. Pat. Nos. 3,673,048 and 3,755,055, both incorporated herein by reference. In certain embodiments, the filter material may comprise membrane materials or fine screened mesh (such as stainless steel screen mesh).

Referring now to FIG. 11, an enlarged sectional view of a portion of the filter plates 118 located in, and sealed between, the bias plate 220 and second bias plate 240 in a channel frame 116 is shown. As can be seen, the side 254 of a first filter plate 118 is received and secured between the bias plate 220 and the bar shaped member 244 of the second bias plate 240, with a bias provided by the opposing spring force of the closed cell bias member 242 which is present when the closed cell material thereof is under compression. Likewise, a second filter plate 118 is received and secured between, the bias plate 220 and the bar shaped member 244 of the second bias plate 240 on an opposite side of the web 214, with a bias provided by the opposing spring force of the closed cell bias member 242 which is present when the closed cell material is under compression. The filter plates 118, when secured in the channel frames 116, separate an interior space between two adjacent filter plates 118 in a single channel frame 116 into an effluent volume 120 from the influent volume 122 located on the opposed side of the filter media 260 therefrom.

Referring to FIG. 2, in the embodiment described, the filtering region 110 includes five channel frames 116 seen in plain view (from above). The three centermost channel frames 116 have two filter plates 118 loaded therein as shown and described with respect to FIG. 11 herein. In contrast, the outermost channel frames 116', i.e. the one abutting sidewall 190, and the one on the opposed side of the three channel frames 116 in the center, and abutting sidewall 192, include only one filter plate 118 therein. These channel frames 116 are interconnected to the adjacent surface of the sidewalls 190, 192, and thus, the effluent volumes 120 thereof are bounded by the channel frame 116, the adjacent sidewall 190 or 192, and the single filter plate 118.

Referring again to FIGS. 1 and 3, openings 128 extend through the boundary wall 114 in alignment with each of the channel frame structures 116 extending from the boundary wall in the direction of the weir 112. In one aspect hereof, the thin walled member 202 of channel frame 116 abutting the boundary wall 114 has an opening therethrough from which the base 208 of the thin walled member 202 and if desired adjacent portions of the web 214 have been removed. Alternatively, the channel frame structure at the boundary wall side 114 thereof may be directly formed on the boundary wall 114, such that individual plate structures may be welded, brazed, or otherwise secured to the inner (weir side) of the boundary plate 114 in the profile of the sidewalls 210, 212 and web 214 of the individual channel frames 116, such that the sides extend to either side of the opening 128 and the web 214 is excluded over the opening 128 in boundary wall 114.

Figure 13:
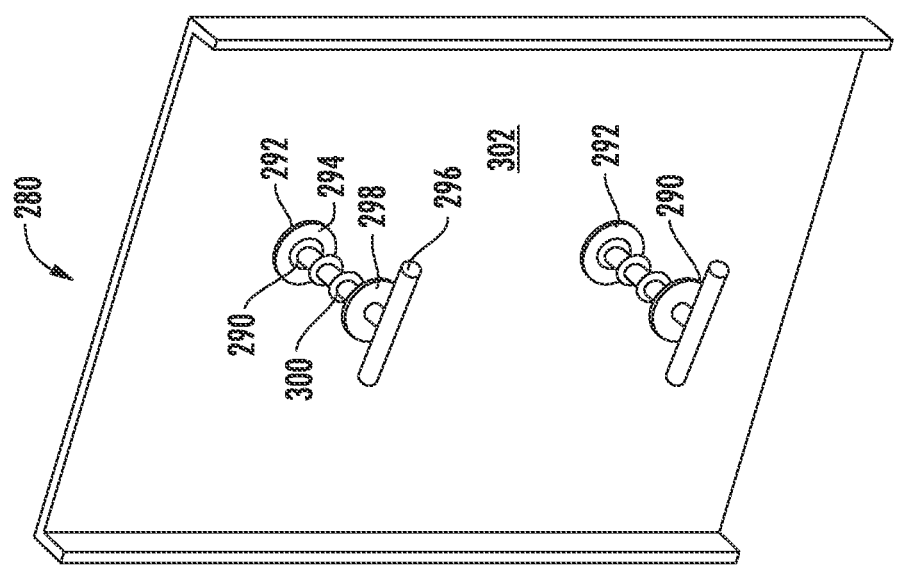
FIG. 13 is a perspective view of a second side of the cover of FIG. 11 used to isolate the interior region of a channel frame from the exit of the filtering apparatus.
Figure 12:
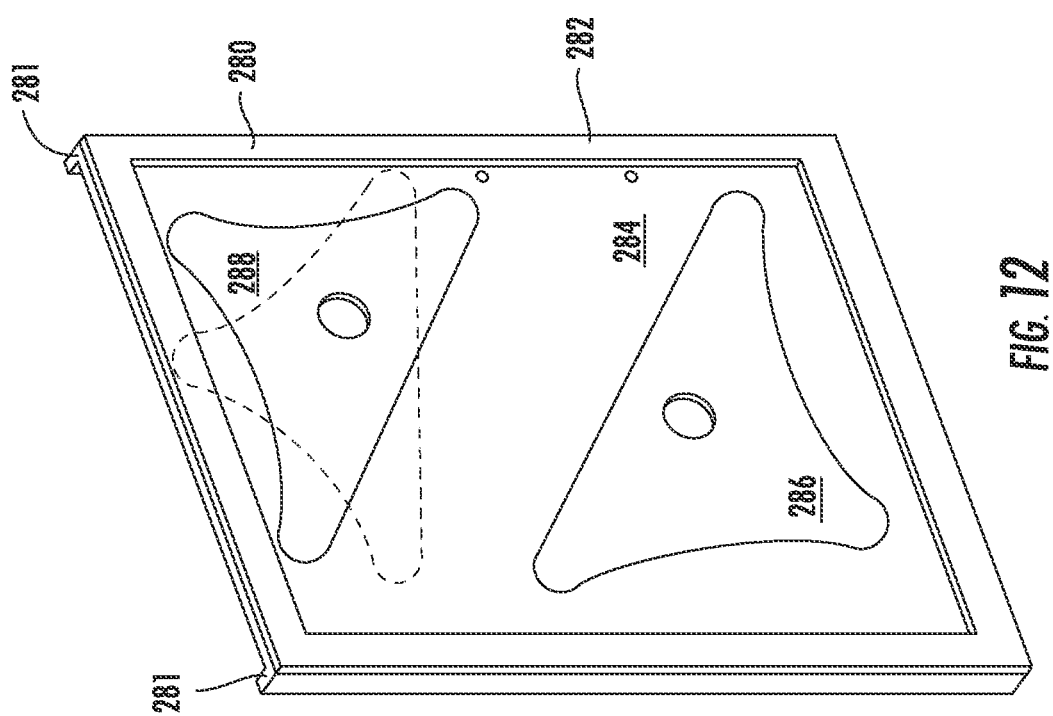
FIG. 12 is a perspective view of a cover used to isolate the interior region of a channel frame from the exit of the filtering apparatus.

Referring to FIGS. 12 and 13, a lockout plate 280, which is used to selectively close openings 128 in boundary wall 114 as the ones shown in FIG. 3, is shown. The lockout plate may also be referred to as a closure. Each lockout plate 280 is a generally planar member having a perimeter having a width and a height greater than that of the openings 128 in boundary wall 114. Each lockout plate includes a sealing face 284 on which a seal 282 such as a rubber gasket is affixed adjacent to, and extends inwardly of, the perimeter of the lockout plate 280. Additionally, extending from sealing face 284 are provided two trilobular locking tabs 286, 288. The locked position of the locking tab 288 is shown in phantom in FIG. 12. The reverse side of the locking plate 280 includes a pair of extending ribs 281 along the edges thereof. The ribs 281 may be formed by bending the opposed edges of the plate 280 rearward, to provide a planar plate structure facing the effluent volume having a greater stiffness. A shaft 290 extends from each locking tab 286, 288 through a sealed opening (not shown) sealed by an o-ring or other sealing member 292 held in place on the lockout plate 280 by a washer 294. On the back side of the lockout plate 280 (FIG. 13), each shaft extends to a T handle 296, and a spring ledge 298 is secured to the shaft 290 outwardly of the back side surface 302 of the lockout plate 280. A spring such as a coil spring 300 extends between the underside of the spring ledge 298 and the facing surface of the washer 284. Thus, the coil spring 300 biases the spring ledge 298 away from the back surface 302 of the lockout plate 280, to pull the trilobular tabs 286, 288 in the direction of the inner surface 284 of the lockout plate 280, and also press the washer 294 against the o-ring to seal the o-ring between back surface 302 and washer 294 to seal the opening of the shaft 290 through the lockout plate 280.

The lockout plates 280 are configured to seal against the outer (effluent channel 106) side of the boundary wall 114. On an occasion when a filter plate 118 needs to be removed from the filtering apparatus 10, the lockout plate 280 is positioned over the downstream side of the opening 128 in a boundary wall 114 associated with the filter plate 118 to be removed, with the seal 282 thereof positioned on the boundary wall 114 surface adjacent to the perimeter of the openings 128. By rotating the T handles in a counterclockwise direction, the locking tab thereof is positioned against the inner side surface of the boundary wall surface, to lock the lockout plate 280 against and over the opening in the boundary wall 114.

This structure and arrangement of the filtering apparatus 10 enables changing of the filter media 260 while filtration of particulates is ongoing through the remainder of the filtering apparatus 10. Depending on the size of the filter plate 118 being removed, it is possible to manually lift the filter plate 118 from the channel frame 116. For larger filter plates 118, an overhead or portable hoist (not shown) may be positioned over the filter plate 118 location in the filtering apparatus 10, and after the lockout plate 280 is located over the opening 128 in the boundary wall 114 associated with the effluent volume 120 serviced by the filter plate 118 being serviced, to seal, or substantially seal, the opening 128 to flow therethrough, the hoist may be used to lift the filter plate 118 from the tank, and to position a replacement or repaired filter plate 118 in position in the channel frame 116. Once the filter plate 118 is again in place in the channel frame 116, the lockout plate 280 is removed thereby reestablishing flow through openings 128. It is contemplated herein that with the use of replacement filter plates, servicing of two filter plates 118 in a single channel frame 116 can be completed in less than an hour, in contrast to the several hours or even days needed for filter service or replacement operations required in the prior art systems. Additionally, the filter plates 118 may be serviced on site, as their parts are simple to manipulate for replacement of the filter media 260 thereof and if required, the filter media plate 262 and frame elements 269.

The channel frames 116 and filter plates 118 allow modularity in the configuration of a filtering apparatus 10. Filter media is commonly available in rolls, wherein cloth type media is available only up to 1500 mm in width (across the roll), and the current industry norm is to limit the span of the filter cloth, in one direction thereof, to 1400 mm. In the present embodiment, by changing the length of the filter plates 118 a number of filter plate sizes, and thus filter media cross sectional areas, can be provided, which can be combined in a desired number of channel frames 116 and filter plates 118 to meet most current filtration needs. For example, having two filter media heights of 700 mm and 1400 mm (as measured in the depth direction of the tank 100), and three lengths of 1000 mm, 2000 mm and 3000 mm (measured in the direction between the influent and effluent ends of the tank 100), a broad range of filter plates 118 having different areas of filter media are configurable. By providing a desired number of individual filter plates 118 and channel frames 116, a filtering apparatus 10 having the desired capacity, in liters or cubic meters of influent per minute or per hour, can be readily fabricated to meet end user filtration needs.

Travelling Backwash Operation

Figure 15:
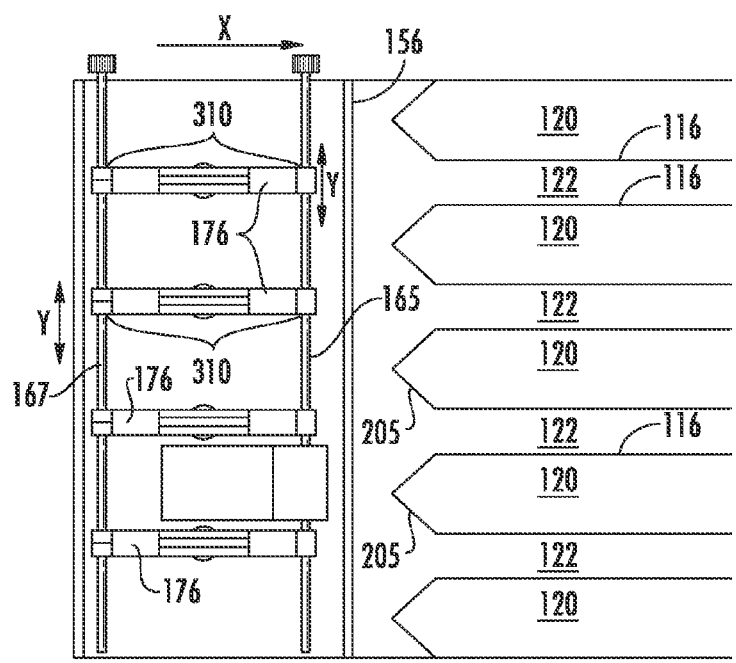
FIG. 15 is a schematic view of the a portion of the travelling backwash unit and tank, showing the positioning of the backwash shoes therein.
Figure 16:
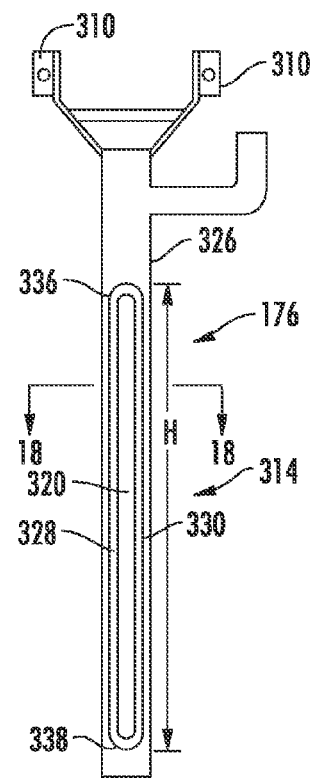
FIG. 16 is a side view of a backwash shoe.

Referring now to FIGS. 14 to 17, the structure and operation the travelling backwash unit 200 is shown. Initially, the structure of the individual backwash shoes 176 are shown in FIGS. 16 and 17. Each backwash shoe 176 is configured to be suspended from a bearing, such as a linear bearing provided by sliding blocks 310 received over the output shaft 165 and idler shaft 167 of the transverse frame 156 of the travelling backwash unit 200. In FIG. 15, the transverse frame 156 is shown with the pump and process piping removed, to show the arrangement of the blocks 310 on the output and idler shafts 165, 167. By attaching the backwash shoes 176 to the sliding blocks 310, the blocks 310, and thus the shoes 176, may move along the shafts 165, 167 in the axial direction thereof, which is transverse to the movement direction of the transverse frame 156 of the travelling backwash unit 200 during backwashing operations. By providing the blocks 310 as plastic pieces, a low friction sliding bearing structure between the blocks 310 and the output and idler shafts 165, 167 may be provided. Thus, as a backwash shoe 176 is moved along the exposed filter media 260 on the filter plates 118 on opposed sides of an influent volume 122 as shown in FIG. 17, the backwash shoe 176 can travel inwardly and outwardly of the filter media 260 surfaces if it encounters discontinuities in the filter media 260 surface being cleaned therewith. Alternatively, the backwash shoes 176 may be suspended from linear bearings.

Referring to FIG. 14, a portion of a single backwash shoe 176 is shown suspended from the output and idler shafts 165, 167 of the travelling backwash unit 200, it being understood that the output and idler shafts 165, 167 extend across the width of, and are supported in bearings in the ends of, the transverse frame 156 (Not shown, best shown in FIG. 2). Each of the backwash shoes 176 includes a support hanger 312, from which a tubular, generally hollow, shoe portion 314 extends downwardly therefrom into the tank 100 (FIG. 1). A fluid exhaust 316 extends outwardly of the side of the shoe portion 314 where it is interconnected, through a valve 180, to process piping on the inlet side of pump 168 (FIG. 1). During backwashing operations, as the shoe 176 travels along opposed filter media 260 surfaces on either side of an influent volume 122, suction in the shoe portion 314 causes fluid to flow through inlets 320, 322 (FIG. 17) in the shoe portion 314, through the valve 180 and process piping 178, into the pump housing, from whence it, and any accumulated particulates removed from the face of the filter media 260 are exhausted through the backwash waste line 174 (FIG. 1). Additionally, during backwashing operations, the transverse frame 156 of the travelling backwash unit is driven across the tank 100, in the forward and reverse of direction X of FIG. 15, whereas the individual ones of the backwash shoes 176 may move freely in the transverse direction of the X direction, namely the Y direction of FIG. 15, by virtue of the sliding blocks 310 sliding on the shafts 165, 167. Hence, as the transverse frame 156 moves from the position thereof in FIG. 17 and then to the right, if one or more of the backwash shoes 176 are out of alignment with an influent region 122, the bumper 205 of each channel frame 116 is configured to guide the backwash shoe 176 into the influent volume 122 between two adjacent channel frames 116. As the transverse frame 156 moves further to the right of FIG. 15, the backwash shoes 176 can begin cleaning the filter media of the filter plates 118 secured in the channel frames 116.

Referring to FIGS. 16 and 17, the backwash shoe 176 is configured as a tubular member defined by a circumferential outer wall 326 terminating in a base. Herein, a backwash shoe may also be referred to as a tubular member. A pair of elongated, generally slit shaped openings 320, 322 extend through the circumferential wall 326, i.e., the openings are generally rectangular in shape, with a very long span compared to their widths. Herein, the openings 320, 322 may also be referred to as first and second side openings as well as first and second vertical openings. The openings 320, 322 extend through the wall 326 and, on the exterior surface 332 of the shoe, the openings are each bounded by opposed projections 328, 330 extending the length of the opening, spaced from the opening to either side thereof. The backwash shoes 176 may employ as the body thereof a circular cross-section stainless steel pipe having an outer diameter ranging from about 25 to 150 mm having one or more slot shaped openings 320, 322 having a width ranging from about 1.5 about 18 mm when the diameter of the tubular body is within the 50 to 150 mm range). Non circular sections, such as trapezoids, pentagons, octagons, etc. are also contemplated. As shown in FIG. 16, the projections 328, 330 may be joined at the upper and lower ends 336, 338 of the openings 320, 322. The projections 328, 330 may simply be pieces of rounded or rectangular bar stock which are welded to the exterior surface 332 of the backwash shoe 176 to surround the opening 320, and thereby form a manifold between the backwash shoe 176 and adjacent filter media 260 during backwashing operations. The total height of the opening "H" as shown in FIG. 16, is slightly smaller than the height of the opening 252 in the frame portion, on the order of one-half inch less, and thus a small quantity of the filter media 260 of the filter plates 118 may not be properly cleaned by the backwash shoe 176.

Referring now to FIG. 17, an enlarged sectional view of the tubular portion of the backwash shoe at section 17-17 of FIG. 16 is shown. The tube shaped shoe portion 314 is sized to extend into an influent volume 122 located intermediate of two effluent volumes (channel frames), such that one-eighth to one quarter of an inch of total clearance is provided between the outer diameter of the shoe portion 314 and the normal spacing between opposed filter media 260 on either side of an influent volume 122. As a result, and because the shoe portion 314 can move toward or away from either filter media 260 by sliding on the output and idler shafts 165, 167, the fluid flow through both openings 320, 322 may be balanced, i.e., if the shoe moves too close to one of the opposed filter media, the flow will become restricted on the opening 320 on that side, causing greater flow inward of the other opening 322 drawing the shoe portion 314 away from the restricted opening. Likewise, because the filter media 260 may slightly deform, the shoe portion 314 may become centered between opposed filter media, wherein the filter media 260 pulls slightly away from the underlying filter media plate 262 directly under, and directly adjacent to, the manifold formed of the projections 328, 330. As a result, fluid may readily pulled be into the openings 320, 322 after flowing along the surface of the filter media 260, allowing a more thorough removal of particulates from the filter media 260.

Figure 17A:
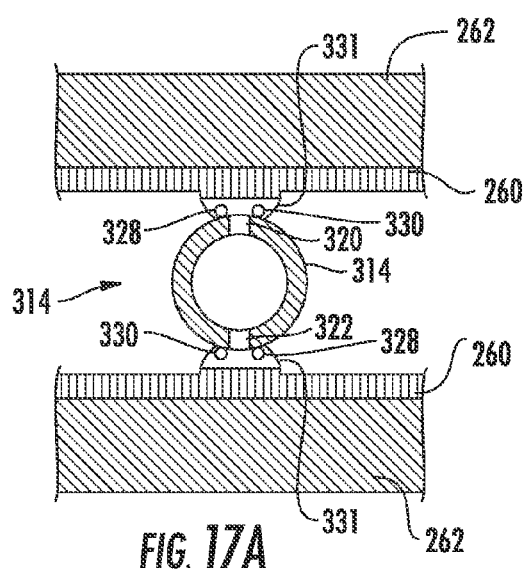
FIG. 17A is a sectional view of an alternative construct of the backwash shoe of FIG. 16 at section 17-17

FIG. 17A shows an alternate construct of the shoe portion 314. In this construct, a shroud 331 extends from the shoe portion 314 and surrounds each opening 320, 322. The shrouds from an enlarged manifold around the openings 320, 322, and also push slightly against the filter media 260 on either side of an influent volume 122, thus tending to center the shoe portion 314 between the opposed filter media 260. The shroud may be a thin walled plastic or a metal such as stainless steel or a coated metal material.

Referring now to FIG. 18, there is schematically shown a partial view of the filtering apparatus 10 with the tank 100 shown in phantom and the channel frames 116 removed showing the backwash shoes 176 of the travelling backwash unit 200 extending inwardly of the tank, in an operating position wherein the shoe portions 314 suspended on the hangers are positioned just at the opening ends 124 into the influent volume 122 between adjacent filter plates 118. For clarity, the weir 112, boundary plate 114, and inlets and outlets to the tank are not shown. The travelling backwash unit storage recess 130 is shown adjacent to the ends of the individual filter frames 118. The depth of the storage recess 130 is the same or substantially the same as that of the tank in the filtering region 110. During normal filtering operations in the filtering apparatus 10, as previously described herein, the transverse frame 156 of the travelling backwash unit 200 is positioned to the right of the Figure, to provide vertical clearance above the individual filter plates 118. During backwashing operations, the motor in the transverse frame 156 drives the pinions 152 to move the transverse frame 156, and the individual backwash shoes 176 suspended therebelow, across the entire width of the tank, i.e., to position the backwash shoes adjacent to the boundary wall 114, and then return the travelling backwash unit 200 to the storage recess 130. This operation allows each filter media 260 on each filter plate 118 to be backwashed in opposed directions, which prevents permanent deformation of the filter media which will occur if the filter media is scanned in only one direction during backwash operations.

During movement of the travelling backwash unit 200 across the tank 100 to clean the filter media 260 of a filter plate 118, typically only one or two of the backwash shoes 176 are connected through the valves to the pump inlet, and hence only those shoes so connected will remove particulates from the surface of the filter media 280 as the plurality of backwash shoes 176 simultaneously move through the influent volume 122. During this operation, the filtering apparatus 10 may continue to filter fluid through the filter plates 118 without meaningful interruption from the backwash unit. The travelling backwash unit 200 may scan an additional pair of filter plates 118 across an influent region immediately, to backwash the additional filter media locations, or may alternate timing of such backwashing operations across different filter media 260 locations. Additionally, if a need arises to service a filter plate 118, the travelling backwash unit 200 is positioned in storage recess 130 so as to not overlie filter plate 118 locations, enabling rapid removal and replacement thereof, and the filtering apparatus 10 is configured to continue operations during periods where filter plates 118 are removed and replaced. Additionally, the locating of the travelling backwash unit 200 on the top of the tank 100, leads to easy servicing thereof, as well as no submerged moving mechanical parts, submersible pumps, or other submerged components that have provided maintenance and reliability issues to prior filtration systems. Likewise, the travelling backwash unit 200 may be readily removed from the top of the tank if need be for servicing thereof.

Multi-Filtration Region Tank

Referring now to FIG. 19, an additional embodiment of the configuration of the filtration system hereof is shown wherein multiple filtering regions 110 are disposed in a single tank 400. In this embodiment, the modularity of the filtering apparatus 10 using the filter frames 118 and channel frames 116 is used to advantage. In particular, tank 400 of this aspect has a centrally disposed backwash unit storage region 402, and two filtering regions 110 composed of filter plates 118 releasably held in channel frames 116 as with the apparatus of FIGS. 1 to 18, which extend in opposite directions from backwash unit storage region 402. The construct of the channel frames 116 and filter plates 118 to form effluent volumes 120 to either side of each influent volume 122 is the same as that described herein with respect to FIGS. 1 to 11, and the details of the description will not be repeated here. The storage region 402 also serves as an inlet region for influent into the filtering apparatus. The fluid flows into the inlet region 404 through process piping 420, and then into influent volumes between adjacent channel frames 116 extending from the inlet region in opposed directions, toward the opposed discharge ends 410, 412 of the tank 400. The effluent volumes bounded by the channel frames 116 and filter plates 118 are, as with respect to the filtering system 10 of FIGS. 1 to 18, fluidly coupled through openings 128 in both boundary walls 114 and into the effluent manifold 406, 408 adjacent thereto, from which the filtered fluid flows through fluid effluent outlets for further processing. A weir, not shown, may optionally be provided on the interior of the side wall 196 of the tank 400, where a fluid influent inlet pipe 420 extends inwardly of the tank 400 sidewall 196. The weir is configured to extend along the interior of wall 196 to deliver influent into the backwash storage region 402, but be located so as not to interfere with movement of the travelling backwash unit 200.

By providing opposed banks of aligned filter plates 118 and channel frames 116 between the opposed effluent manifolds 406, 408 and the inlet region 404, the size of the filtering apparatus, and the filtering capacity thereof is effectively doubled, without doubling of the cost thereof, in comparison to the embodiment hereof shown and described in FIGS. 1 to 11. In particular, the use of a single travelling backwash unit 200 to clean the filter media 260 of two adjacent filtering regions 110 allows costs to be significantly less than double a single system, because redundant pumps, valves, and motors need not be reproduced.

Figure 21:
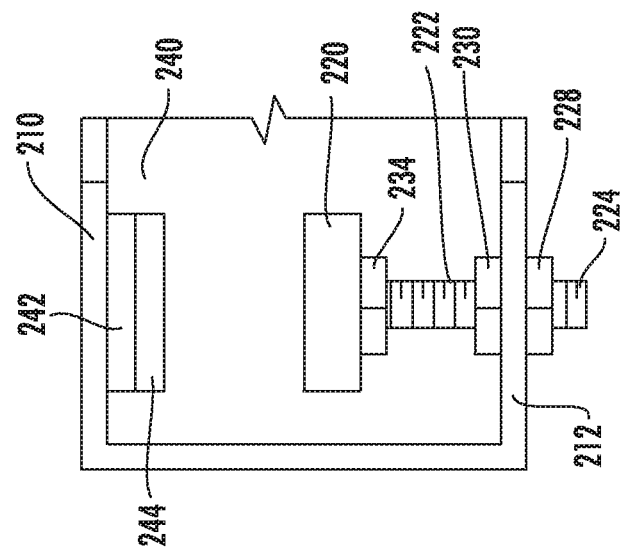
FIG. 21 is a sectional view of the dam channel frame of FIG. 20 at section 21-21.
Figure 20:
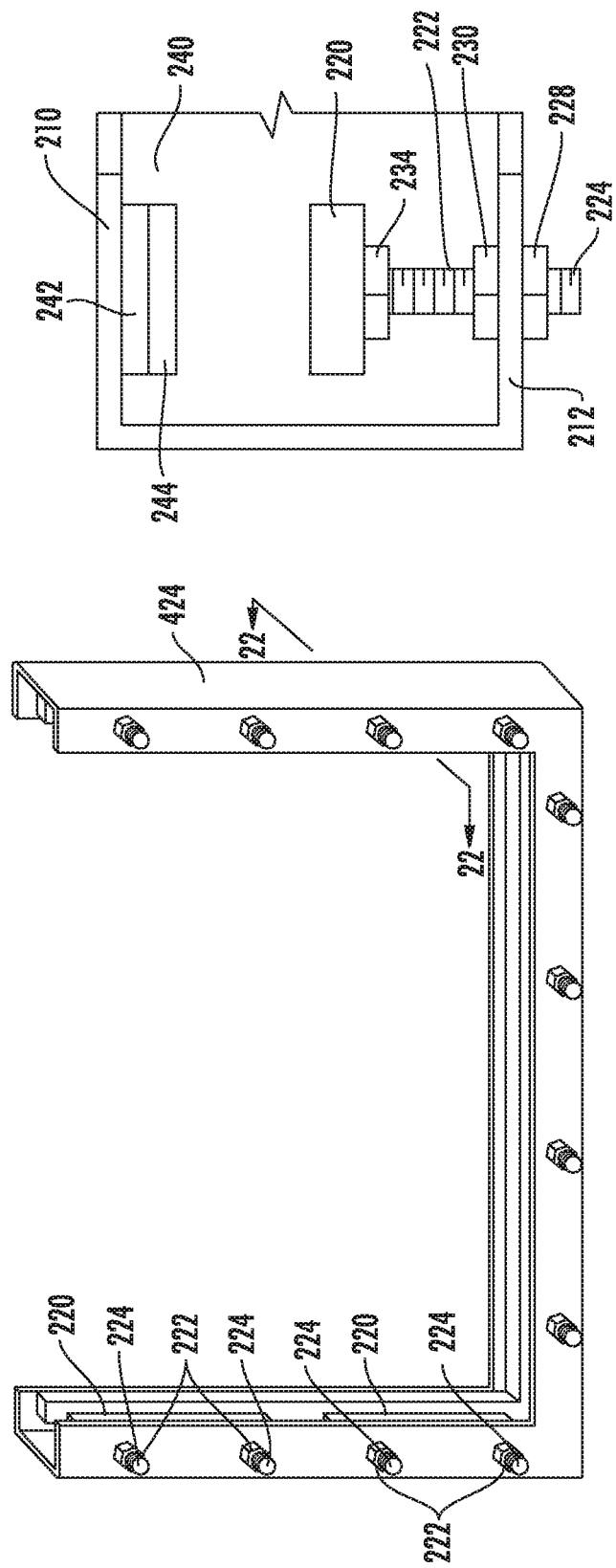
FIG. 20 is a perspective view of a dam channel frame useful in the filtering apparatus of FIG. 19.

FIGS. 19 to 21 also show an additional feature of a multi-filtering region 110 system. In this apparatus, a removable dam plate 422 is locatable in the tank 400 to separate regions of the tank into two different fluid volumes. As a result, one volume containing a filtering region 110 is isolatable from fluid flowing through the influent pipe 420 and into the storage recess 130, while another volume having a second filtering region 110 remains in fluid communication with the influent coming into the storage recess 130, the travelling backwash unit 200 for backwashing of the filter media 260 thereof, and effluent manifold 408. To hold the dam 422 plate in place, a C-shaped, in cross section, dam channel frame 424, configured similarly to the channel frames 116, is provided across the width of the tank 400 in a direction perpendicular to the direction of the channel frames 116 and filter plates 118, at a location directly outward of the ends of the channel frames 116 of each filtering region (only one shown). In FIG. 19, a dam plate 422 is located in one of the two dam channel frame 424 thereof, and prevents fluid flow from the storage region 402 in the direction of effluent manifold 406.

Referring to FIGS. 20 and 21, similarly to the channel frames 116, the dam channel frames 424 are configured to include a dam plate securing system to hold, and seal the sides of, a dam plate 422 received therein. However, unlike thin walled members 202 of the channel frames 116, the C shaped channel 424 does not have a center web. Thus, as shown in FIG. 20, the C shaped channels include bias plates 220, each of which are provided on standoffs 222 extending from one side of the C-shaped channels 424 and spaced from an opposite side surface of the C shaped channel 424. Each standoff 222 includes a pair of threaded studs 224 spaced in the length direction of the second side of the C shaped channel, having a first end thereof 226 extending through a hole in the second side, and secured in the hole by first nut 228 and second nut 230 threaded over the studs 224 and positioned on either side of the second side surface. An extending portion of the studs 224 extends from the second side surface in the direction of first side surface, where they are threadingly received in a nut 234 adhered to a side of bias plate 220. To attach the bias plates 220 to the web, stud 224 is first threaded and secured into nuts 234 on bias plates 220, and nut 230 is also threaded thereon to a position adjacent the nut 234. The remaining extending portion of stud 224 is extended through a hole provided therefore in the second side surface of the C shaped channel, and the first nut 228 is threadingly secured thereover on the opposite side of the second side. The standoff distance of the bias plate 220 from the adjacent surface of the second side, and the distance between the front surface 236 of the bias plates 220 to the adjacent facing surface of sides 210 or 212, is determined and set by the relative position of the stud 224 within nut 234, as well as the relative positions of the first and second nuts 228, 230 on the stud 224.

The securing system also includes a second bias plate 240, located on the inwardly facing surface of side 210 or 210 and thus facing the bias plates 220. Second bias plates 240 include a conformable member 242 permanently adhered to the inwardly facing surface of the sides 210 or 212, and a solid bar shaped member 244 affixed to the conformable member 242 such that the conformable member 242 is positioned between the side 210 or 212 and the bar shaped member 244. Conformable member 242 is a close cell foam material, which in a free state biases the bar shaped member 242 away from the inner wall of sides 210, 212 to which it is affixed, but which may be compressed to allow the plate shaped member to move in the direction of the wall of the side 210, 212 of the C shaped channel 424 to which it is attached. The dam plate 422 is a solid plate shaped member, having lifting openings 450 extending therethrough adjacent its uppermost surface when located in tank 400, and having a thickness greater than the free state distance between bias plate 220 and the bar shaped member 244. As a result, when the dam plate 422 is slid into or positioned in the dam channel frame 424 the bar shaped member 244 is pushed toward the adjacent wall of the side 210 or 212, and the conformable member provides a bias to maintain the opposed surfaces of the dam plate 428 against the surface of the bar shaped member 244 and bias plate 220, and thus form a seal against leakage of influent past the dam plate 422. Additionally, the channel for the dam plate 422 is preferably oriented such that the influent (fluid flowing into the tank) side thereof presses the dam plate 422 against the bar shaped member 244.

If extended service of either of the filtering regions 110 is required, travelling backwash unit is moved into the backwash storage region 402 so as not to overlie the adjacent dam channel frame 424 location, and the dam plate 422 is inserted into the dam channel frame 424, after which the tank volume of the filtering region 110 being serviced is fluidly isolated from influent flowing therein by the presence of the dam plate 422. By fluidly isolating the effluent port coupled to the manifold adjacent to the filtering region 110 being serviced (manifold 406 in FIG. 19), that side of the tank 400 may be drained and serviced, while the remaining portion of the tank having the other filtering region remains operational. As either filtering region 110 may be isolated by the positioning of dam plate 422 in the proper dam channel frame 424, a first filtering region 110 may be drained, serviced, and put back into operation while second filtering region 110 continues filtering operations, and likewise the second filtering region 110 may be isolated, drained, serviced, and brought back on line while filtering continues in the first filtering region 110. As a result, the filtration facility operator has further freedom of operation in the selection of equipment, and when to bring the equipment down for maintenance, because at least one filtering region of the multi-filtering region apparatus continues to operate. Thus scheduled maintenance may be undertaken during known periods of low filtration requirements, and the amount of excess capacity required for redundancy during such periods is reduced.

Referring now to FIG. 22, an alternate construct wherein including the channel frames 116 is described. In this construct, in addition to being spaced across the width direction of the tank 100, two (or more) channel frames are aligned in the direction between the influent inlet 102 and the boundary wall 114. In this construct, a juncture between two adjacent, and generally collinearly aligned channel frames 116, also includes an aperture (not shown) extending through the wall of the channel frame 116 to allow effluent from the effluent volume 120' to flow into the effluent volume 120, and thence through the openings 128 in the boundary wall and thence out of the tank 100. In FIG. 22, although two channel frames are collinearly arranged in the direction generally perpendicular to the boundary wall 114, and five channel frames are provided across the width of the tank, a greater number of channel frames 116 may extend collinearly in the direction generally perpendicular to the boundary wall 114, and a greater or lesser number may be spaced across the width direction of the tank 100.

At the juncture 500 of the channel frames extending collinearly in the direction generally perpendicular to the boundary wall 114, the channel frame will include the opening therein (not shown) for flow between adjacent effluent volumes 120, 120'. The thin walled member at adjoining channel frames 116 may include only one base portion 208, from which the sides 210, 212 and the web 214 extend on either side thereof.

Modified Backwash Shoes

Referring now to FIGS. 23 to 28, configurations of, and operation of, backwash shoes configured to simultaneously remove filtered particulates from the filter media, and sludge from the bottom of the tank or other enclosure, are shown.

Figure 23:
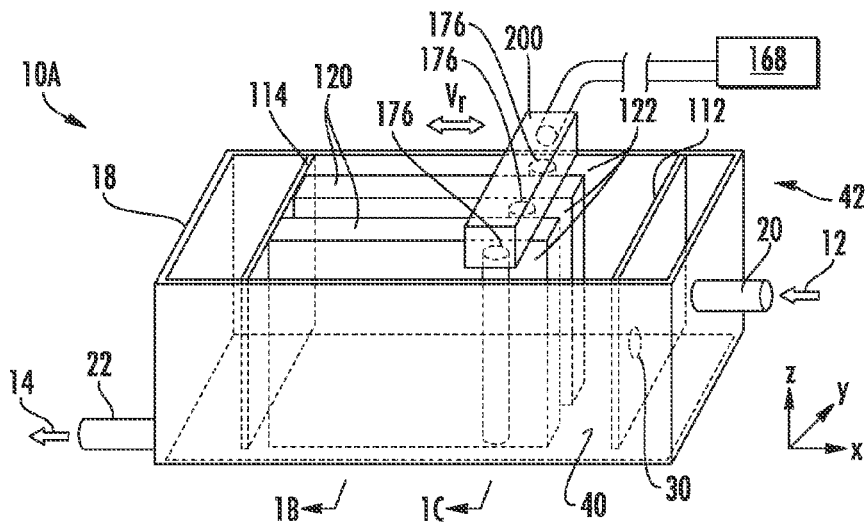
FIG. 23 is a top perspective view of filtering apparatus including a tank, a fluid influent inlet for receiving influent into the enclosure, a fluid effluent outlet for directing effluent out of the enclosure, a plurality of influent volumes and effluent volumes, at the interface of which filter media is provided to filter particulates from the influent to produce the effluent, and backwash shoes having openings for removing the particulates from the enclosure.

Referring to FIG. 23, a top perspective view of an additional exemplary filtering apparatus 10A configured to remove particulates from a flow of influent fluid 12 flowing into the filtering apparatus 10A and pass the filtered fluid influent therefrom as fluid effluent 14 is shown. The filtering apparatus 10A has the same general construct of the filtering apparatus 10 of FIGS. 1 to 13 herein, but is not limited thereto. The filtering apparatus 10A includes an enclosure such as a tank 18, an fluid influent inlet 20 for receiving the fluid influent 12 into the enclosure 18, an fluid effluent outlet 22 for directing the fluid effluent 14 from the tank 18, and a plurality of effluent volumes 120 having filter media thereon for removing particulates from the fluid influent 12 in adjacent influent volumes 122, and passing the fluid through the filter media to form the fluid effluent 14, and a plurality of backwash shoes 176 in communication with a backwash pump 168 configured to simultaneously remove particulates filtered from the fluid influent from the filter media, and also remove accumulated sludge from a base 40 of the tank 18. In contrast to the embodiments of the filtering apparatus described previously herein, for purposes of illustration the construct of filtering apparatus 10A includes an influent volume 122 located on either side of each of the effluent volumes 120. However, the backwash shoe hereof is useful in both an embodiment where an effluent volume 120 is located on either side of each influent volume 122 as is shown, for example, in FIGS. 1 and 2, or where, as here, an influent volume 122 is located to either side of each effluent volume 120. Each of these components of the filtering apparatus 10A is now briefly introduced as an introduction before specifics of embodiments are discussed below.

The tank 18 serves as flow tank for the fluid influent 12 and directs the fluid influent 12 to the influent volumes 122 and thence into the effluent volumes 120 which are supported within the tank 18. The tank 18 may be made of a strong resilient material such as metal, aluminum or plastic to minimize leakage of the influent 12. The fluid effluent inlet 20 directs the fluid influent 12 into the tank 18 and the fluid effluent outlet 22 directs the fluid effluent 14 out of the tank 18. The fluid effluent outlet 22 may be disposed at a lower elevation than the top of an inlet weir 112 such that flow through the tank 18 is driven by gravity.

As with tank 100 of FIGS. 1 and 2, the tank 18 may include an inlet weir 112 and a boundary wall 114. The inlet weir 112 may buffer changes in a flow rate of the fluid influent 12 through the fluid effluent inlet 20. The boundary wall 114 may be used to at least partially support the structure forming the effluent volumes 120 and it includes openings 128 (FIG. 24) therethrough for the respective ones of the effluent volumes 120 to facilitate the flow of the filtered fluid effluent 14 from the effluent volumes 120 to the fluid effluent outlet 22. In this manner, the tank 18 provides for the movement of the influent 12 to be directed from the fluid effluent inlet 20 to the fluid effluent outlet 22 as fluid effluent 14. The effluent volumes 120 may be defined by each of channel frames 116 extending from the boundary wall in the direction of the weir 112, and filter plates 118 interchangeable receivable and removable from, the channel frames 116, thus forming a plurality of influent volumes 122 and fluid effluent volumes 120 in a generally parallel spaced arrangement as set forth previously herein, for example with relation to FIGS. 10 and 11. Alternatively, the effluent volumes may be structurally configured as box shaped structures, affixed to the base of the tank 18, or other physical constructs by which fluid effluent may be separated from fluid influent by the flow of the fluid through a filter media.

Figure 24:
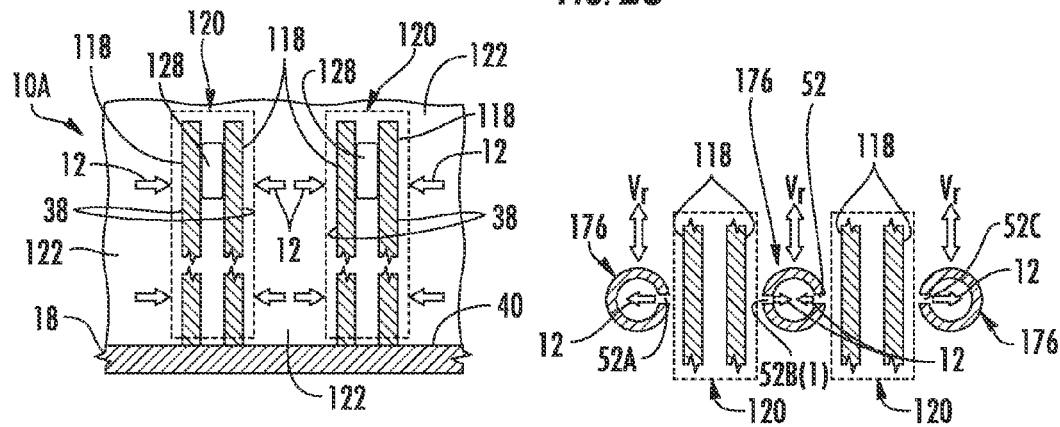
FIG. 24 is a vertical sectional view of the filtering apparatus of FIG. 23 depicting the fluid influent volumes and fluid effluent volumes within the tank.

FIG. 24 is a vertical sectional view of the filtering apparatus 10A of FIG. 23 schematically depicting filter plates 118 disposed within the tank 18 to form a parallel, spaced arrangement of effluent volumes 120 and influent volumes 122. The filter plates 118 include filter media thereon or therein through which the fluid influent 12 passes to be filtered into the fluid effluent 14 as was discussed previously herein with respect to FIG. 11. The filter media of the filter plates 118 removes particulates from the influent 12 as the influent 12 passes therethough to form effluent 14 which departs the effluent volumes via the openings 128 of the boundary wall 114. The particulates collect on the filter media on the influent side surfaces 38 of the filter plates 118 and also settle to the base 40 of the tank 18. Additionally, sludge may form along the base 40 of the tank 18.

Figure 25:
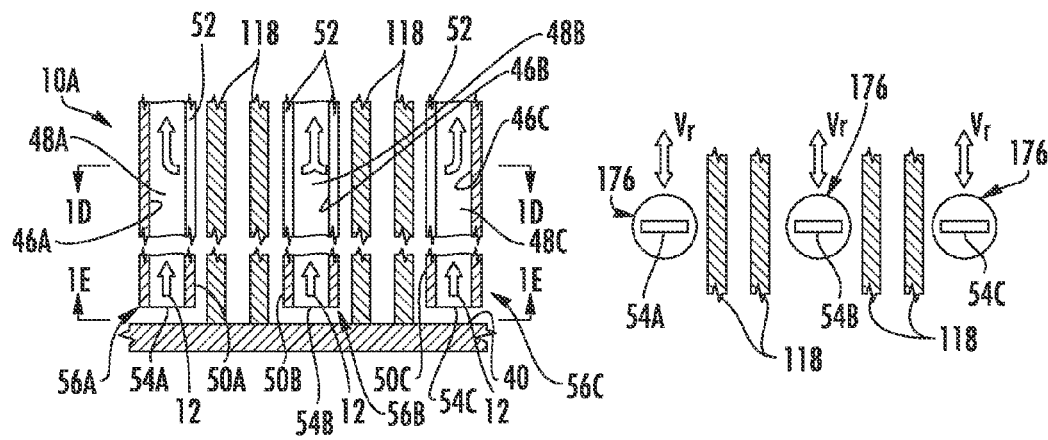
FIG. 25 is a vertical sectional view of the filtering apparatus of FIG. 23 depicting the backwash shoes with openings at distal ends to remove particulates from a base of the tank.
Figure 27:
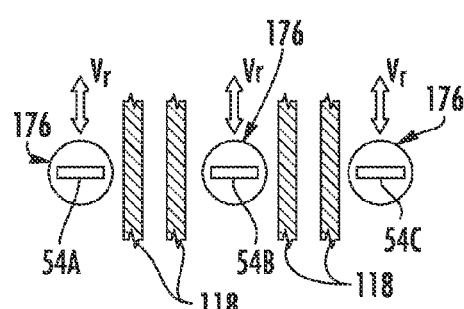
FIG. 27 is a horizontal sectional view of the filtering apparatus of FIG. 1A depicting end openings at distal portions of the backwash shoes.

With reference back to FIG. 23, the filtering apparatus 10A also includes the backwash shoes 176 in communication with a backwash pump 168 (shown schematically to remove the particulates collected on the filter media from the tank 18. The backwash shoe 176 is configured as a tubular member defined by a circumferential outer wall 326. Accordingly, a backwash shoe may also be referred to as a tubular member. The backwash shoes 176 may extend from above an upper portion 42 of the tank 18 to a position immediately adjacent, but spaced from, the base 40 of the tank 18, as is shown in FIG. 8. The backwash shoes 176, and their connection to, and operation with respect to, the transverse frame 156 and travelling backwash unit is, except as specifically noted hereafter, the same as previously described herein. The backwash shoes 176 may be suspended from the transverse frame 156 of a travelling backwash unit 200 as is shown in FIG. 1, to move the backwash shoes 176 in movement directions Vr with respect to the tank 18 to facilitate the removal of particulates from the filter media of the filter plates 118 and simultaneously remove sludge and/or particulates from the base 40 of the tank 18. The movement Vr may be, for example, translational movement. There are several features of the backwash shoes 176 which enable the particulates to be removed from the tank 18 therewith. FIG. 25 is a vertical sectional schematic view of the filtering apparatus 10A of FIG. 23 depicting the backwash shoes 176 proximate to the filter plates 118. The backwash shoes 176 include an inner conduit 46 forming a passageway 48 in selective communication with the backwash pump 168. The backwash shoes 176 also include a generally cylindrical exterior surface 50 which, when the backwash shoes 176 are moved into the influent volumes 122, may be located directly adjacent to the filter plates 118 on either side of each relevant influent volume 122 as shown regarding the central backwash shoe 176 in FIG. 25. The backwash shoes 176 may include the cylindrical shape to facilitate smooth movement along the filter plates 118 without catching or tearing the filter media therewith.

Figure 26:
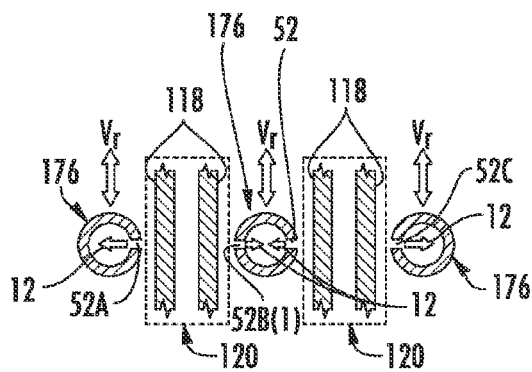
FIG. 26 is a horizontal sectional view of the filtering apparatus of FIG. 1A depicting the backwash shoes with side openings to remove particulates collected on surfaces of the filter media.

As shown in FIGS. 25 and 26, the backwash shoes 176 include side openings 52 for removing particulates from the upstream, i.e., influent side, surfaces 38 (FIG. 24) of the filter media of the filter plates 118. Herein, the side openings 52 may also be referred to as vertical openings. The side openings 52 allow movement of the particulates into the passageways 48 of the backwash shoes 176, which in turn are communicable with the backwash pump 168, wherein one or more of the backwash shoes 176 are connected to the pump 168 at one time. The inner conduit 46 is connected to the exterior surface 50 of the backwash shoes 176 via the side opening(s) 52 of the backwash shoes 176. In this manner, the particulates filtered from the fluid influent are removed from the upstream surfaces 38 of the filter media of the filter plates 118.

As shown in FIGS. 25 to 28, the backwash shoes 176 also include end openings 54 positioned thereon for removing sludge and particulates from the base 40 of the tank 18. The end openings 54 are disposed at a distal portion 56 of each backwash shoe 176. Herein, the distal portion may also be referred to as a lower end portion. The end opening 54 allows movement of the particulates and other material such as sludge accumulated adjacent to the base 40 of the tank 18 into the passageway 48 which leads to the backwash pump 168. The inner conduit 46 of each backwash shoe 176 is thus also connected to the exterior surface 50 of the backwash shoe 176 at the end opening 54 of the backwash shoe 176. In this manner, the particulates and other material such as sludge accumulated adjacent to the base 40 of the tank 18 are removed from the base 40 of the tank 18.

Figure 28:
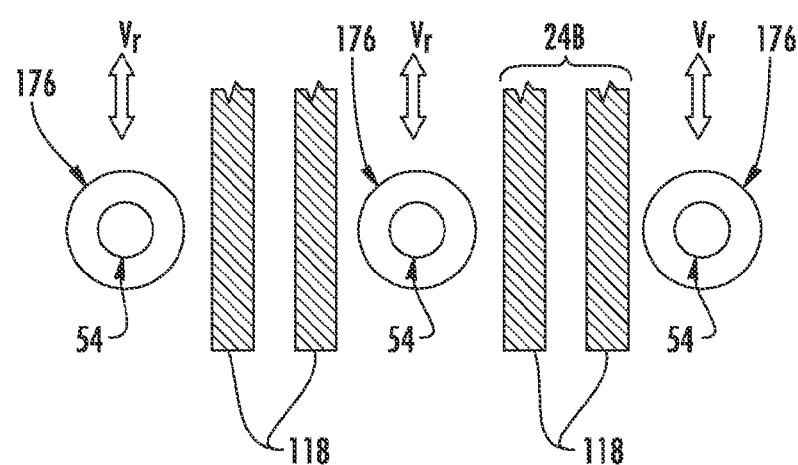
FIG. 28 is a horizontal sectional view of the filtering apparatus of FIG. 1A depicting another embodiment of the end openings at distal portions of the backwash shoes, wherein the end openings are round apertures.

It is noted that the end opening 54 may be a slot (FIG. 27) having an aspect ratio of at least two (2) and a maximum width of the opening arranged with a non-parallel angle, preferably about ninety degrees, with respect to the movement Vr of the backwash shoes 176 with respect to the tank 18. In this manner, the coverage or width of the slot in the direction perpendicular to the travel direction of the backwash unit 200 and thus the backwash shoe 176 is maximized to increase the quantity of particulates and/or sludge exposed to the end opening 54 while the minimum width of the slot in the short direction thereof may reduce the suction requirements of the backwash pump 168. Alternatively, as shown in FIG. 28, a single round aperture having an opening diameter on the order of 6 mm to 18 mm may form the end opening 54, or a plurality of smaller apertures may extend through the end surface of the backwash shoes 176 to provide the end openings.

The individual backwash shoes 176 are sized to extend downwardly into the tank 18 to approximately 12 mm to 25 mm from the base 40 of the tank 18 to remove accumulated particulates, and other material, such as sludge that has accumulated adjacent to the base 40 of the tank 18. The backwash shoes 176 of the present disclosure may employ as the body thereof a circular cross-section stainless steel pipe having an outer diameter ranging from about 25 mm 150 mm. Non-circular sections, such as trapezoids, pentagons, octagons, etc. are also contemplated. In exemplary embodiments the backwash shoe 176 has two suction slots (side openings 52) positioned one-hundred eighty (180) degrees from each other and extending generally vertically in the tank 18 to be positioned directly adjacent to a filter media on filter plates 118 on opposite sides of an influent volume 122, and thus effectively clean two filter media upstream surfaces simultaneously. The side openings may have a width ranging from about 1.5 mm to about 18 mm when the diameter of the stainless steel pipe is within the 50 to 150 mm range). At a distance measured tangential to the pipe of approximately 6 mm to 25 mm from the side opening 52, on both sides of the side opening, opposed projections 328, 330 extending the length of the side opening and spaced from the side opening to either side thereof, may be provided. The projections may be configured by welding or otherwise attaching stainless steel rods (3 mm to 12 mm diameter) along the length of the side opening at either side thereof, and about the opposed ends thereof. These cylindrical rods serve to form an effective seal, allowing relatively clean (filtered) fluid to be drawn through the filter media in a "reverse direction" during backwashing and carry captured solids away from the filter media and into the space formed by the rods, into the side openings, and into the inner conduit of the backwash shoe, while substantially preventing "short-circuiting" of relatively unclean (unfiltered secondary effluent) from entering the backwash shoe during backwashing. In certain embodiments, at or near the ends of the side openings, two similar sized (diameter) cylindrical rods may be connected perpendicularly to the ends of the cylindrical rods running the length of the side openings to effectively form a cleaning hood volume or chamber between the cloth media and the backwash shoe. Importantly, the longitudinal rods may be set back from the side opening to form first and second sub-chambers on opposite sides of the side opening, wherein the sub-chambers have sufficient volume to allow gradual straightening and relaxing of fibers of the filter media being backwashed. In certain embodiments, this gradual straightening and relaxing may comprise an angular reversal of at least some of the fibers of the filter media during a backwashing operation. The angular reversal of fibers may assist in releasing particulates trapped in filter media.

In operation, to clean a filter media of a filter plate 118, and simultaneously remove accumulated particulates and/or sludge from the base of the tank, the travelling backwash unit 200 moves the backwash shoes 176 into the influent volumes 122. One or more of the backwash shoes are fluidly connected to the pump 168 by valve 180 (FIG. 18) such that the filter media is cleaned of particulates by fluid flowing into the side openings 52 of each backwash shoe fluidly connected to the pump 168, and in those same backwash shoes fluidly connected to the pump 168, sludge and particulates are sucked inwardly of the end openings 54. Thus, by simply sweeping the backwash shoes 176 inwardly and outwardly of the influent volumes 122, the filter media interposed between the influent volume and the effluent volume, and the base 40 of the tank 18 may be cleaned, without the need to drain the tank or manually direct a suction nozzle into the tank to access built up deposits of particulates and/or sludge therein. Thus, sludge and particulates are removed from the base 40 of the tank 18 while sludge and particulates are removed from the filter media.

The features and operation of the apparatii shown herein provide numerous advantages over prior art systems. These include, but are not limited to:

Lower tank height as process piping, and process mechanical features, are not located at the base of the tank;

Lower cost of ownership, based on maintenance of the system and system uptime, including the ability to backwash during filtering operations, the ability to isolate one or more effluent regions and service same while other effluent regions remain in service and fluid is flowing therein after being filtered;

Longer filter media lifetimes as a result of the floating backwash shoe operation;

Low initial cost, by using the modular design of the system and the ability to use a single backwash system for multiple filtering regions;

Manufacturability of a filtering apparatus having different filtering capacities using identical raw materials in the fabrication thereof, and the ability to modularize the system using these components and concepts; and Longer time periods between draining of the tank to remove accumulated sludge and particulates.

While the foregoing is directed to embodiments of the present disclosure, other and further embodiments of the disclosure may be devised without departing from the basic scope thereof, and the scope thereof is determined by the claims that follow, wherein where the claims state that the system comprises "a" or "an" or a "first" feature, this also encompasses apparatii and methods comprising more than one of the relevant feature.

What is claimed is:

1. A fluid filtering apparatus, comprising:
  a backwash pump;
  a tank at least partially surrounding an inner volume, the tank comprising a fluid influent inlet, a fluid effluent outlet, and a base;
  a first filter media disposed within the inner volume and disposed to separate the fluid influent inlet from the fluid effluent outlet such that fluid flows therethrough from the fluid influent inlet to the fluid effluent outlet; and
  a first tube extending downward from a first end to a second end, the first tube movable with respect to the tank and an influent side surface of the first filter media, wherein the first tube comprises an inner conduit, a first side opening between the first end and the second end, and an end opening at the second end, wherein the inner conduit forms a passageway in communication with the backwash pump and a portion of the inner volume disposed between the first tube and the first filter media via the first side opening when the first tube is positioned adjacent the first filter media, and wherein the inner conduit also forms a passageway in communication with the backwash pump and a portion of the inner volume disposed between the first tube and the base of the tank via the end opening.

2. The fluid filtering apparatus of claim 1, wherein the first tube extends from the first end at an upper portion of the tank to the second end at a position adjacent to the base of the tank.

3. The fluid filtering apparatus of claim 1, wherein the first tube has a cylindrical shape.

4. The fluid filtering apparatus of claim 1, further comprising a travelling backwash unit, wherein the first tube forms part of the traveling backwash unit, and wherein the traveling backwash unit is arranged to provide translational movement of the first tube relative to the tank.

5. The fluid filtering apparatus of claim 1, wherein the end opening of the first tube is a round aperture.

6. The fluid filtering apparatus of claim 1, wherein the end opening is a slot having an aspect ratio of at least two.

7. The fluid filtering apparatus of claim 6, wherein a longer dimension of the slot is disposed perpendicular to a movement direction of the first tube along the first filter media.

8. The fluid filtering apparatus of claim 1, wherein the inner conduit forms an open connection between the first side opening and the end opening.

9. The fluid filtering apparatus of claim 1, further comprising a second filter media arranged in a parallel spaced relationship to the first filter media, wherein the first tube is moveable in between the first filter media and the second filter media, simultaneously along the first and second filter media.

10. The fluid filtering apparatus of claim 9, wherein the first tube comprises a second side opening, and wherein the inner conduit forms a passageway in communication with the backwash pump and a portion of the inner volume disposed between the first tube and the second filter media via the second side opening.

11. An apparatus for filtering a fluid stream, comprising:
a tank having a fluid influent inlet and a fluid effluent outlet and a boundary wall separating the fluid influent inlet from the fluid effluent outlet;
a plurality of influent volumes and a plurality of effluent volumes arranged side by side in parallel to one another, and
a first tube extending downward from a first end to a second end, wherein;
at least one of said plurality of influent volumes is fluidly communicable with at least one effluent volume of said plurality of effluent volumes through a filter media, the plurality of effluent volumes extending from an influent region to the boundary wall; wherein each effluent volume is arranged in fluid communication with the effluent outlet through a separate opening in the boundary wall; wherein the influent volumes are arranged in fluid communication with the fluid influent inlet; and wherein the first tube has an outer wall and terminates in a lower end portion disposed adjacent to a base of the tank, the first tube having at least a first vertical opening between the first end and the second end, the first vertical opening extending through the outer wall adjacent to the filter media, and the first tube further having at least one end opening in the lower end portion at the second end adjacent to the base of the tank.

12. The apparatus of claim 11, wherein the first tube includes a second vertical opening therein disposed through the outer wall in a position opposite to the first vertical opening.

13. The apparatus of claim 11, wherein the end opening in the lower end portion of the first tube is a round aperture.

14. The apparatus of claim 11, wherein the end opening in the lower end portion of the first tube is a slot.

15. The apparatus of claim 11 further comprising a travelling backwash unit, the first tube forming part of the travelling backwash unit, wherein the travelling backwash unit is configured to move the first tube along the filter media in the tank.

16. The apparatus of claim 11, wherein the first tube is fluidly connected to a pump.

17. The apparatus of claim 16, wherein the pump is fluidly connected to a waste line extending outwardly of the apparatus.

18. The apparatus of claim 15, wherein the travelling backwash unit includes a number of additional tubes suspended from a transverse frame of the travelling backwash unit, each additional tube being fluidly connectable to the pump through a valve, the valve being configured to selectively fluidly connect one or more of the additional tube to the pump.

19. The fluid filtering apparatus of claim 1, wherein the first tube extends vertically downward along a straight path from the first end to the second end.

20. The fluid filtering apparatus of claim 11, wherein the first tube extends vertically downward along a straight path from the first end to the second end.

* * * * *